United States Patent
Sugahara et al.

(10) Patent No.: US 9,727,289 B2
(45) Date of Patent: Aug. 8, 2017

(54) INFORMATION PROCESSING APPARATUS AND METHOD PERFORMING PRINTING TO A PRINTER WITH A CHARGING FUNCTION

(71) Applicant: CANON KABUSHIKI KAISHA, Tokyo (JP)

(72) Inventors: Asako Sugahara, Tokyo (JP); Ritsuko Otake, Tokyo (JP); Osamu Iinuma, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/995,047

(22) Filed: Jan. 13, 2016

(65) Prior Publication Data
US 2016/0219160 A1 Jul. 28, 2016

(30) Foreign Application Priority Data
Jan. 22, 2015 (JP) .................................. 2015-010315

(51) Int. Cl.
G06F 3/12 (2006.01)

(52) U.S. Cl.
CPC .......... *G06F 3/1285* (2013.01); *G06F 3/1219* (2013.01); *G06F 3/1232* (2013.01); *G06F 3/1236* (2013.01); *G06F 3/1239* (2013.01); *G06F 3/1253* (2013.01); *G06F 3/1205* (2013.01)

(58) Field of Classification Search
None
See application file for complete search history.

(56) References Cited

U.S. PATENT DOCUMENTS

| | | | | |
|---|---|---|---|---|
| 6,773,176 B2* | 8/2004 | Kurosawa | ............ | G06K 15/129 358/1.9 |
| 7,020,408 B2* | 3/2006 | Lester | .................... | G03G 21/02 399/79 |
| 7,072,866 B1* | 7/2006 | Hara | ...................... | G03G 21/02 705/52 |
| 7,839,521 B2* | 11/2010 | Bard | ..................... | G06F 3/1222 358/1.15 |
| 8,643,869 B2* | 2/2014 | Takamiya | ................ | H04N 1/46 358/1.1 |

(Continued)

FOREIGN PATENT DOCUMENTS

JP 2007-43494 2/2007

OTHER PUBLICATIONS

U.S. Appl. No. 14/813,878, filed Jul. 30, 2015.

*Primary Examiner* — Dung Tran
(74) *Attorney, Agent, or Firm* — Fitzpatrick, Cella, Harper & Scinto

(57) ABSTRACT

An object of the present invention is to appropriately control a display relating to charging accompanying printing processing in accordance with the situation on the side of a printing apparatus in an information processing apparatus that is connected to the printing apparatus. The present invention is an information processing apparatus including an acquisition unit configured to acquire information on a printing apparatus that is specified as an output destination by a user and a determination unit configured to determine whether or not to present charging information relating to printing based on the acquired information on a printing apparatus.

16 Claims, 21 Drawing Sheets

(56) References Cited

U.S. PATENT DOCUMENTS

| | | | |
|---|---|---|---|
| 8,660,883 B2* | 2/2014 | Zhao | G06Q 30/0283 |
| | | | 705/400 |
| 2001/0056406 A1* | 12/2001 | Nagoya | G06Q 30/06 |
| | | | 705/52 |
| 2002/0165833 A1* | 11/2002 | Minowa | G06Q 30/0283 |
| | | | 705/400 |
| 2006/0074816 A1* | 4/2006 | Hibara | G06Q 30/0283 |
| | | | 705/400 |
| 2007/0024880 A1* | 2/2007 | Sato | H04N 1/54 |
| | | | 358/1.9 |
| 2007/0031160 A1* | 2/2007 | Kondo | G03G 21/02 |
| | | | 399/79 |
| 2008/0030750 A1* | 2/2008 | Kato | G03G 21/02 |
| | | | 358/1.4 |
| 2009/0103138 A1* | 4/2009 | Honda | G06F 15/16 |
| | | | 358/1.18 |
| 2009/0147306 A1* | 6/2009 | Sugiyama | G06F 3/1222 |
| | | | 358/1.15 |
| 2009/0238599 A1* | 9/2009 | Kim | G03G 21/02 |
| | | | 399/79 |
| 2010/0253968 A1* | 10/2010 | Nuggehalli | G06F 3/126 |
| | | | 358/1.15 |
| 2012/0257243 A1* | 10/2012 | Kai | G06F 21/10 |
| | | | 358/1.14 |
| 2012/0269525 A1* | 10/2012 | Shindo | G06F 3/1208 |
| | | | 399/39 |
| 2013/0110744 A1* | 5/2013 | Hendley | G06Q 10/06 |
| | | | 705/413 |
| 2015/0036176 A1* | 2/2015 | Naruse | H04N 1/00925 |
| | | | 358/1.15 |

* cited by examiner

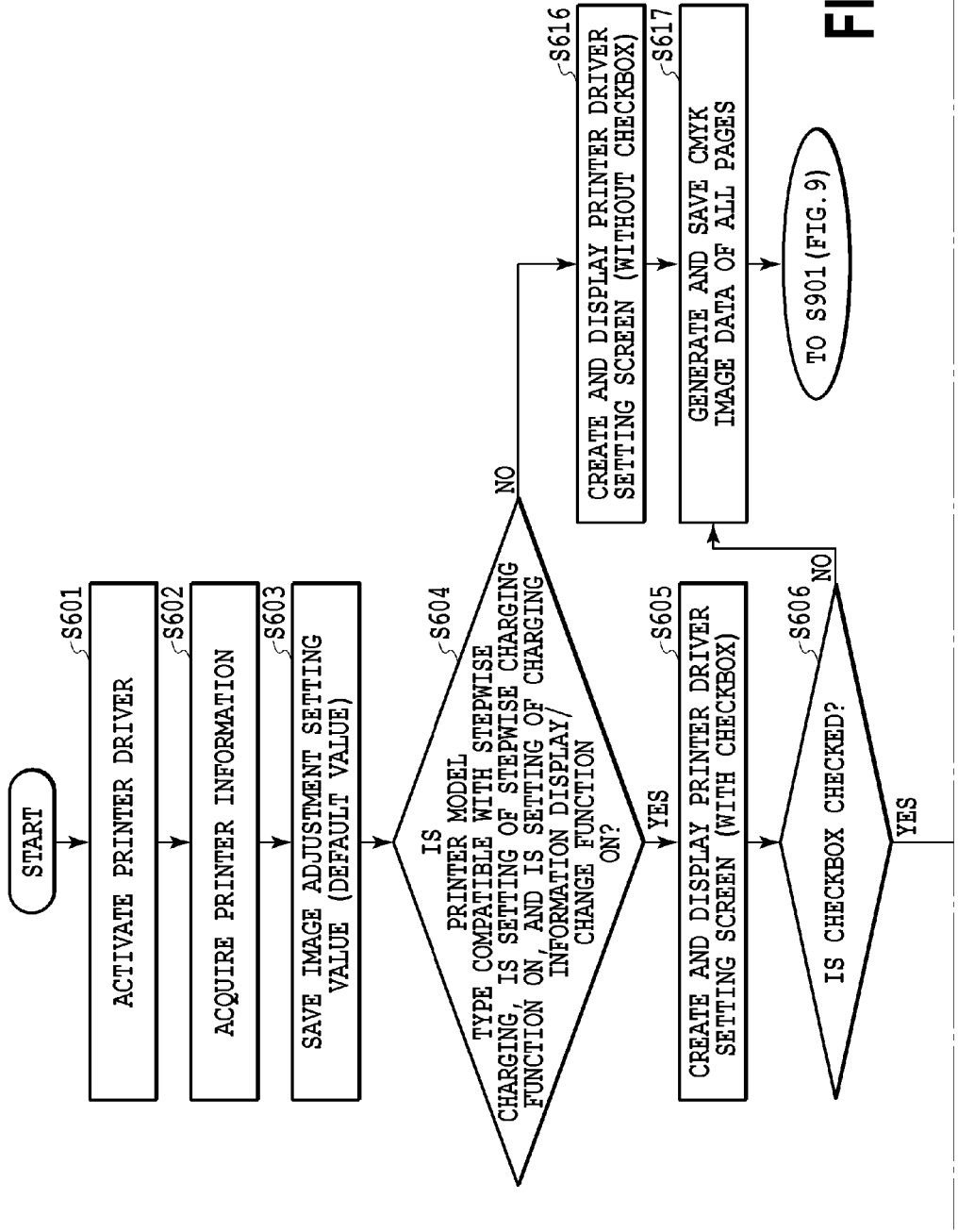

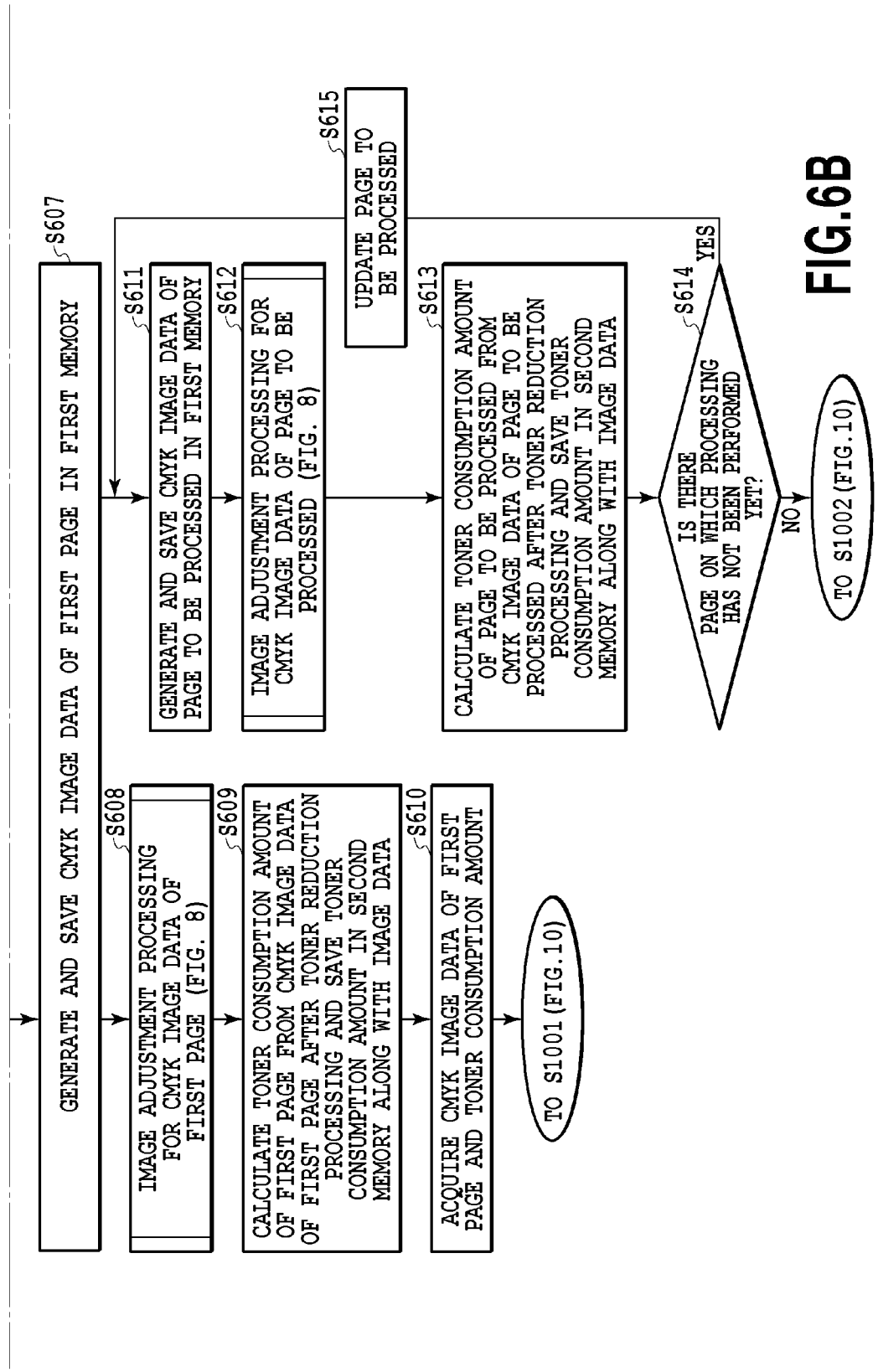

FIG.7A

```
PROPERTY OF PRINTER001                              700

BASIC   | PAGE    | FINISH | SHEET | PRINT
SETTING  | SETTING |        | FEED  | QUALITY

DOCUMENT SIZE
  NUMBER OF COPIES         [ A4        ▼ ]
  [ 1    ▲▼ ]
                           PAGE LAYOUT
                           [ 1in1      ▼ ]

ONE-SIDE/BOTH-SIDE
                           [ ONE-SIDE  ▼ ]

701  [✓] DISPLAY CHARGING  DISCHARGE METHOD
         INFORMATION       [ SORT      ▼ ]

[ OK ]   [ CANCEL ]
                                702       703
```

FIG.7B

```
PROPERTY OF PRINTER002                              704

BASIC   | PAGE    | FINISH | SHEET | PRINT
SETTING  | SETTING |        | FEED  | QUALITY

DOCUMENT SIZE
  NUMBER OF COPIES         [ A4        ▼ ]
  [ 1    ▲▼ ]
                           PAGE LAYOUT
                           [ 1in1      ▼ ]

ONE-SIDE/BOTH-SIDE
                           [ ONE-SIDE  ▼ ]

DISCHARGE METHOD
                           [ SORT      ▼ ]

[ OK ]   [ CANCEL ]
                                705       706
```

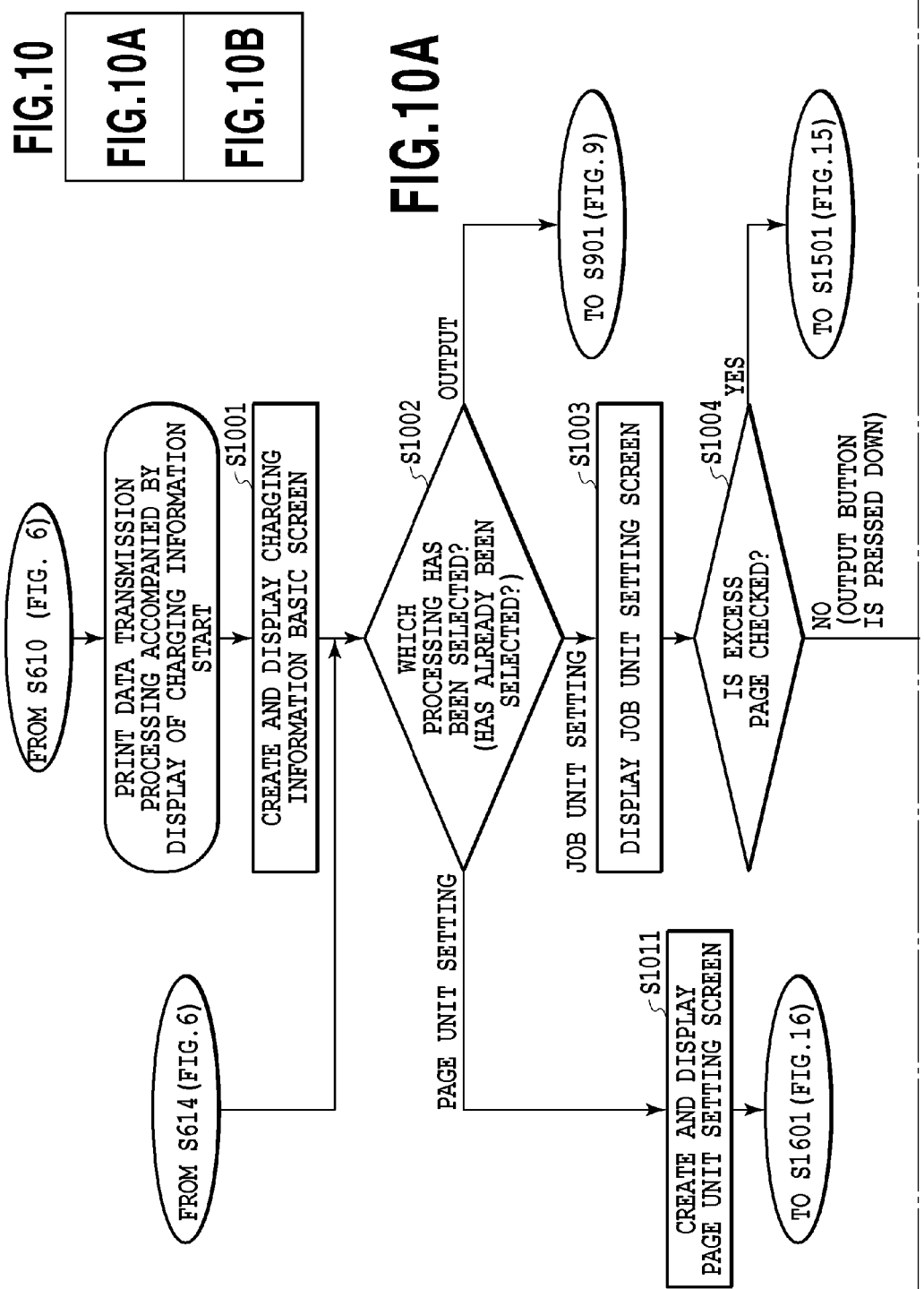

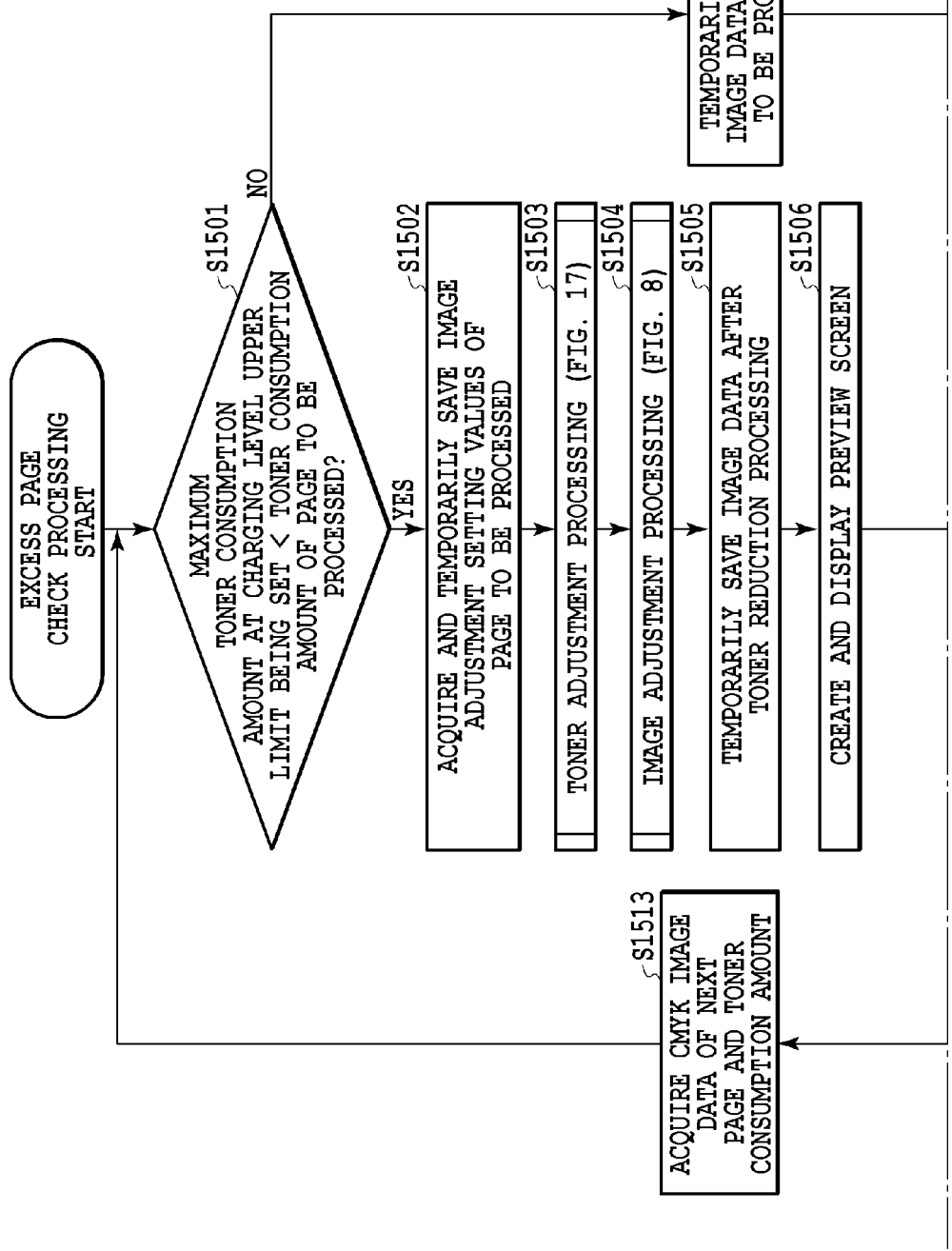

US 9,727,289 B2

INFORMATION PROCESSING APPARATUS AND METHOD PERFORMING PRINTING TO A PRINTER WITH A CHARGING FUNCTION

BACKGROUND OF THE INVENTION

Field of the Invention

The present invention relates to a charging processing technique to perform charging in accordance with a toner consumption amount that is necessary for printing processing.

Description of the Related Art

Conventionally, there exists an image forming apparatus having a charging function to perform charging each time a user performs printing. Here, there are a variety of charging systems that are adopted in the image forming apparatus, and as an example of the charging system, there exists stepwise charging in which the charging amount increases stepwise as the toner consumption amount increases.

For example, Japanese Patent Laid-Open No. 2007-43494 discloses a printing apparatus that determines a charging amount in accordance with a toner consumption amount by calculating the toner consumption amount at the time of printing an image and performs image processing to reduce the toner consumption amount so that the charging amount will be within the range corresponding to the amount of money that is put into by a user. Further, Japanese Patent Laid-Open No. 2007-43494 discloses that the image processing to reduce the toner consumption amount described above may be performed by an information processing apparatus, such as a PC, in place of the printing apparatus.

SUMMARY OF THE INVENTION

In the case where the processing relating to charging is performed by an information processing apparatus in place of the printing apparatus as described in Japanese Patent Laid-Open No. 2007-43494, a plurality of printing apparatuses may be the target of the processing via a LAN or the like. In this case, a variety of types can be considered as printing apparatuses that are connected and there is a possibility that printing apparatus having the charging function and printing apparatuses not having the charging function will be intermingled. Consequently, even in the case where the information processing apparatus side performs processing relating to charging, on a condition that the printing apparatus side is not compatible with charging, the processing relating to charging that is performed on the information processing apparatus side will be wasteful processing.

The present invention is an information processing apparatus including an acquisition unit configured to acquire information on a printing apparatus that is specified as an output destination by a user, and a determination unit configured to determine whether or not to present charging information relating to printing based on the acquired information on a printing apparatus.

Further features of the present invention will become apparent from the following description of exemplary embodiments (with reference to the attached drawings).

BRIEF DESCRIPTION OF THE DRAWINGS

FIG. 6 is a diagram showing the relationship between FIG. 6A and FIG. 6B;

FIG. 6A and FIG. 6B are flowcharts showing a flow of pre-display preparation processing of a charging information screen;

FIG. 7A and FIG. 7B are each an example of a setting screen (property screen) of a printer driver;

FIG. 10 is a diagram showing the relationship between FIG. 10A and FIG. 10B;

FIG. 10A and FIG. 10B are flowcharts showing a flow of print data transmission processing accompanied by a display of charging information;

FIG. 15 is a diagram showing the relationship between FIG. 15A and FIG. 15B;

FIG. 15A and FIG. 15B are flowcharts showing a flow of excess page check processing;

DESCRIPTION OF THE EMBODIMENTS

First Embodiment

[System Configuration]

Figure 1:
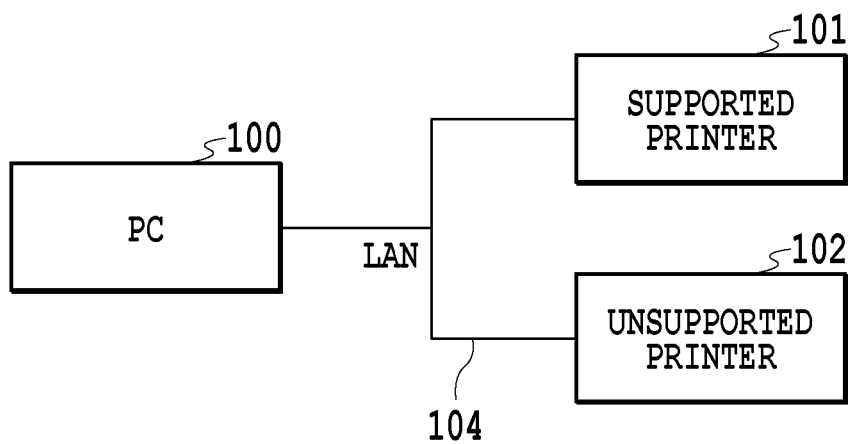
FIG. 1 is a block diagram showing a configuration example of a printing system including an information processing apparatus.

FIG. 1 is a block diagram showing an example of a configuration of a printing system including an information processing apparatus 100 according to the present embodiment. As shown in FIG. 1, the printing system includes the information processing apparatus 100, an image forming apparatus 101 of the model type compatible with stepwise charging described previously, and an image forming apparatus 102 of the model type incompatible with stepwise charging.

These apparatuses are connected via a network, such as a LAN 104, and it is possible for the information processing apparatus 100 and the image forming apparatus 101 or the image forming apparatus 102 to transmit and receive various kinds of data therebetween.

The information processing apparatus 100 transmits a print job (including print data described in a PDL and its printing setting) to the image forming apparatus 101 and the image forming apparatus 102. The information processing apparatus is, for example, a PC. In the following, for simplification, the information processing apparatus 100 is denoted as the PC 100.

The image forming apparatus 101 of the model type compatible with stepwise charging and the image forming apparatus 102 of the model type incompatible with stepwise charging perform printing on a sheet in accordance with the print job received from the PC 100. Specifically, the image forming apparatus is an apparatus having a printing function, such as a printer, a fax machine, and an MFP. In the following, for simplification, the image forming apparatus 101 of the model type compatible with stepwise charging is denoted as the supported printer 101 and the image forming apparatus 102 of the model type incompatible with stepwise charging is denoted as the unsupported printer 102.

In the PC 100, a printer driver that is necessary to use the supported printer 101 is installed and further, a printer driver that is necessary to use the unsupported printer 102 is also installed. In the case where the supported printer and the unsupported printer are different model type printers, different printer drivers for the respective printers are installed in the PC 100. However, the case is also supposed where the supported printer and the unsupported printer are the printers of the same model type and the stepwise charging function is given to the printer as an optional function that is sold separately. In such a case, a printer driver common to both the supported printer 101 and the unsupported printer 102 is installed in the PC 100.

It is possible for a service person or an administrator to set whether or not to make use of the stepwise charging function in the supported printer 101 and whether or not to permit the presentation of charging information to a user and the change of charging information from a user (i.e., whether or not to set the charging information display/change function to be effective) to ON/OFF, respectively. In the case where both the stepwise charging function and the charging information display/change function are set to ON, it is made possible for a user of the PC 100 who has specified the supported printer 101 as the output destination to check and change information relating to charging at the time of performing printing processing via a property screen (see FIG. 7A, to be described later), a charging information basic screen (see FIG. 11, to be described later), etc., which are displayed on the display unit of the PC 100.

Figure 2:
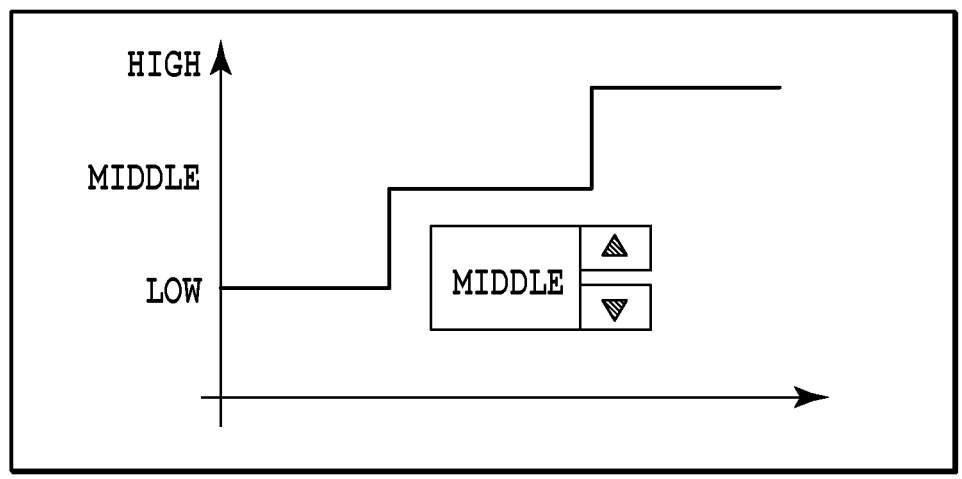
FIG. 2 is a diagram showing an example of charging information.

In the present embodiment, in the case where a user specifies the supported printer 101 as the output destination from the PC 100 and performs printing, on a condition that the user desires charging information to be displayed via the above-described property screen, charging information as illustrated in FIG. 2 is displayed. Here, the charging information is information relating to charging, such as a graph by which it is possible to check the charging level in stepwise charging. Details of charging information will be described later by using FIG. 7A, FIG. 11, etc. On the other hand, in the case where a user specifies the unsupported printer 102 as the output destination from the PC 100 and performs printing, the above-described charging information is not displayed (see FIG. 7B).

[Configuration of PC]

Figure 3:
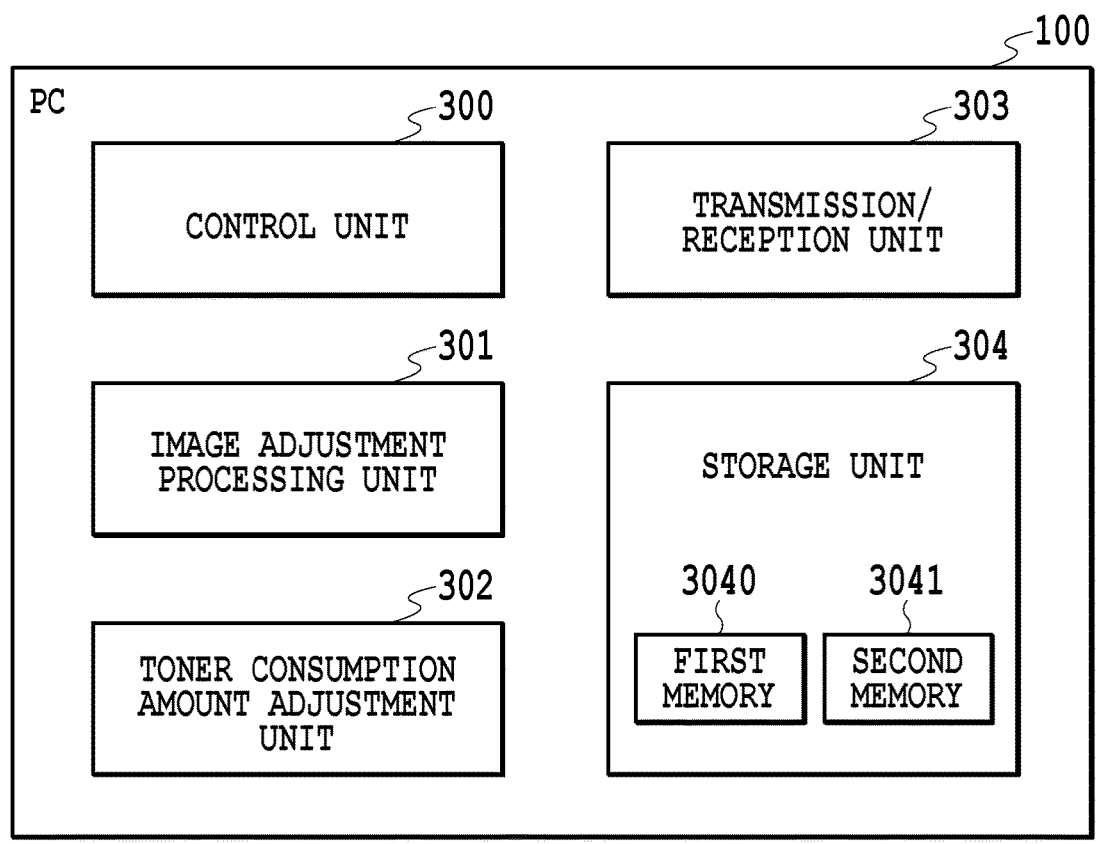
FIG. 3 is a function block diagram showing an internal configuration of an information processing apparatus.

FIG. 3 is a function block diagram showing an internal configuration of the PC 100. As shown in FIG. 3, the PC 100 includes a control unit 300, an image adjustment processing unit 301, a toner consumption amount adjustment unit 302, a transmission/reception unit 303, and a storage unit 304.

The control unit 300 includes a CPU, a ROM, a RAM, etc., and totally controls the PC 100 and implements each unit below by developing a program stored in the ROM onto the RAM and executing the program. Further, the control unit 300 also generates RGB bitmap image data from application data to be printed (hereinafter, printing-target application data), and further generates CMYK bitmap image data to be used in the printer from the RGB bitmap image data.

The image adjustment processing unit 301 performs image processing, such as density adjustment processing, sharpness processing, and toner reduction processing, on CMYK bitmap image data in accordance with image adjustment setting values. The image adjustment setting values are values for specifying the degree in the density adjustment processing and the sharpness processing described above, and a user can set the setting values arbitrarily. Details of the image adjustment processing unit 301 will be described later.

The toner consumption amount adjustment unit 302 finds a toner consumption amount that is necessary to derive the charging state displayed on a screen (hereinafter, charging information screen), on which charging information is presented to a user, by calculation or the like from the CMYK bitmap image data on which the above-described image processing has been performed. Further, the toner consumption amount adjustment unit 302 performs, in the case where the toner consumption amount that is found exceeds a maximum toner consumption amount, processing to adjust the toner consumption amount (hereinafter, toner adjustment processing), such as processing to suppress the toner consumption amount to an amount equal to or less than the maximum toner consumption amount.

The transmission/reception unit 303 transmits data, such as a print job, to the external equipment, such as the supported printer 101 and the unsupported printer 102. Further, the transmission/reception unit 303 receives data of printer information or the like, such as model type information unique to the printer or information on the setting performed by an administrator or the like, from the printers 101/102 as the external equipment.

The storage unit 304 includes, for example, a hard disk for storing programs and data. In the storage unit 304 according to the present embodiment, there exist a first memory 3040 for saving CMYK bitmap image data on which the image processing, such as density adjustment, has not been performed yet, the data of the above-described image adjustment setting values, etc., and a second memory 3041 for saving CMYK bitmap image data on which the image processing, such as density adjustment, has been performed and various kinds of data (toner consumption amount or the like) associated with the CMYK bitmap image data. It may also be possible to configure the first memory 3040 and the second memory 3041 as physically separated storage units, or to use them by internally dividing the area of the same storage unit.

[Configuration of PC and Configuration of Image Processing Unit]

Figure 4:
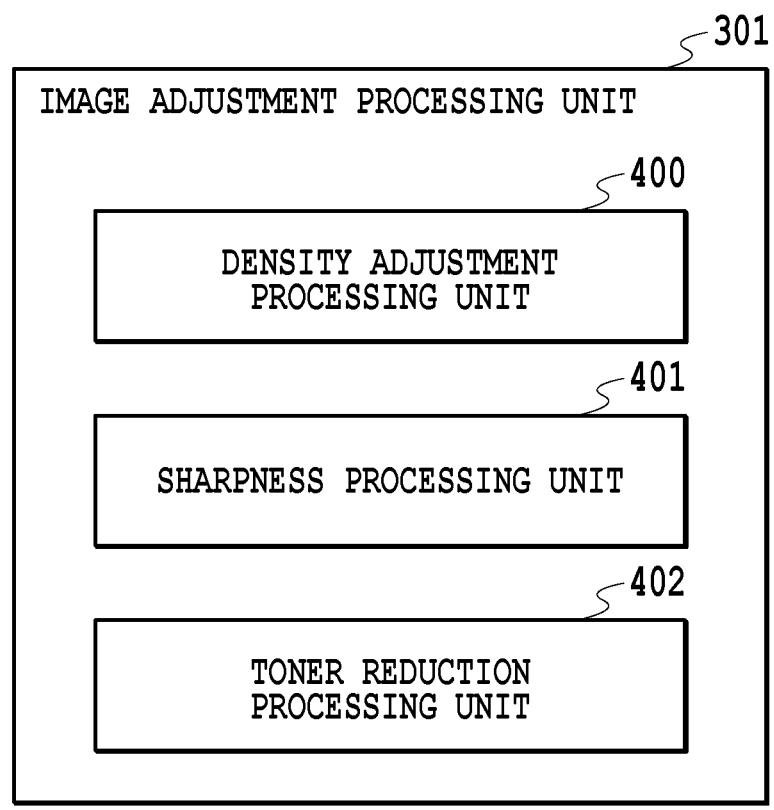
FIG. 4 is a function block diagram showing an internal configuration of an image adjustment processing unit.

FIG. 4 is a function block diagram showing an internal configuration of the image adjustment processing unit 301. As shown in FIG. 4, the image adjustment processing unit 301 includes a density adjustment processing unit 400, a sharpness processing unit 401, and a toner reduction processing unit 402.

The density adjustment processing unit 400 performs density adjustment processing on CMYK bitmap image data in accordance with the density adjustment setting value included in the image adjustment setting values. Specifically, the density adjustment processing unit 400 adjusts the pixel value (density value) by a linear function that uses a coefficient determined from the density adjustment setting value for each pixel of the CMYK bitmap image data.

The sharpness processing unit 401 performs sharpness processing on CMYK bitmap image data in accordance with the sharpness adjustment setting value included in the image adjustment setting values. Specifically, the sharpness processing unit 401 enhances or blurs the edge portion within an image by performing a convolution operation using a coefficient array that is determined from the sharpness adjustment setting value.

The toner reduction processing unit 402 performs processing to convert (reduce) the total of the amount of toner in each of CMYK colors to a specified value (limit of amount of toner) on CMYK bitmap image data.

[Configuration of Supported Printer and Unsupported Printer]

Figure 5A:
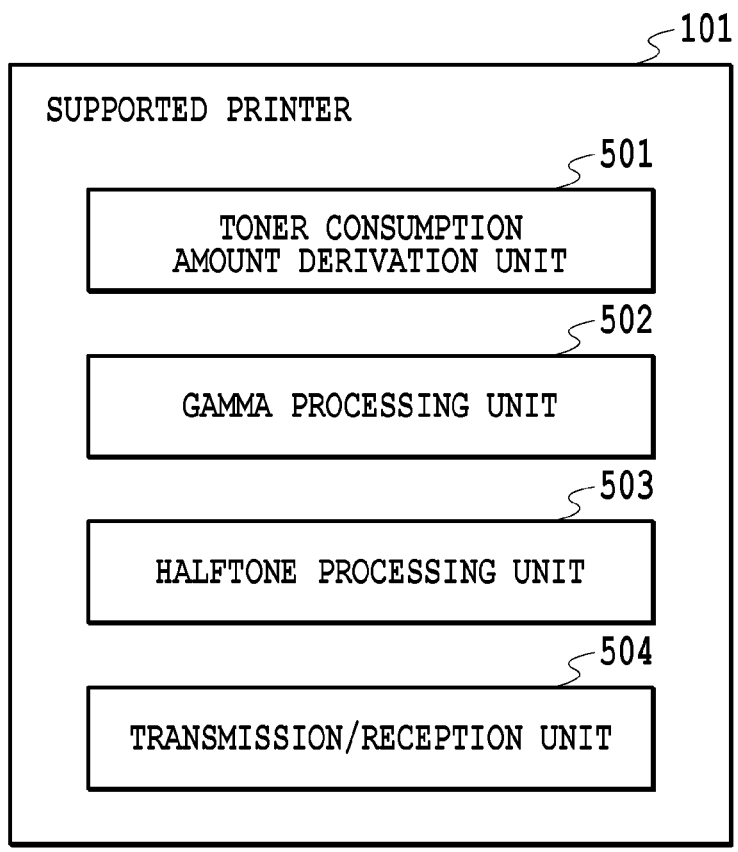
FIG. 5A and FIG. 5B are function block diagrams each showing an internal configuration of an image forming apparatus.
Figure 5B:
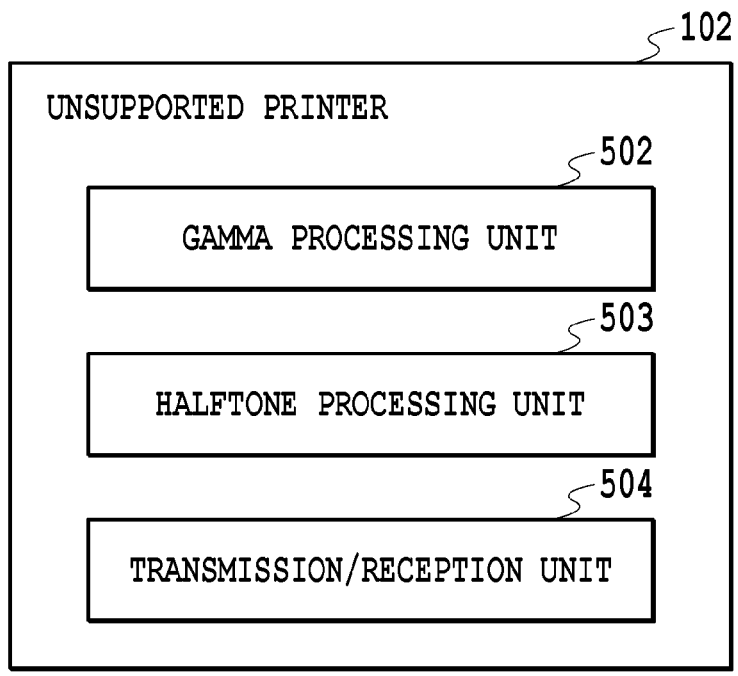

FIG. 5A and FIG. 5B are function block diagrams showing internal configurations of the supported printer 101 and the unsupported printer 102, and FIG. 5A is a function block diagram of the supported printer 101 and the FIG. 5B is a function block diagram of the unsupported printer 102.

As shown in FIG. 5A, the supported printer 101 includes a toner consumption amount derivation unit 501, a gamma processing unit 502, a halftone processing unit 503, and a transmission/reception unit 504.

The toner consumption amount derivation unit 501 derives the toner consumption amount that is necessary for the printing processing of the image data by calculation or the like from the CMYK bitmap image data as the print data that is included in the print job received from the PC 100. The actual charging is performed on the supported printer 101, and therefore, it is necessary for the supported printer 101 side to derive the toner consumption amount separately from the toner consumption amount that is found in the case where the PC 100 displays the charging information screen. Because of this, the supported printer 101 side also has the toner consumption amount derivation unit 501 separately from the toner consumption amount adjustment unit 302 of the PC 100.

The gamma processing unit 502 performs gamma processing on CMYK bitmap image data. The gamma processing is processing that is performed in order to match the gradation characteristics of a printer to an ideal state. The image data on which the gamma processing has been performed is sent to the halftone processing unit 503.

The halftone processing unit 503 generates halftone image data having a number of tone levels suitable to the output of the printing unit (not shown) by performing halftone processing on the CMYK bitmap image data on which the gamma processing has been performed. Specifically, for example, from 8-bit multivalued image data having 256 tone levels, image data whose number of tone levels of the pixel value of each pixel is reduced to a number of tone levels, such as two, four, and sixteen, is generated.

The transmission/reception unit 504 performs transmission/reception of various kinds of data, such as reception of the previously described print job from the PC 100.

The unsupported printer 102 does not need to derive the toner consumption amount that is necessary for the printing processing because of not having the stepwise charging function. Consequently, as shown in FIG. 5B, the toner consumption amount derivation unit 501 does not exist in the unsupported printer 102.

[Pre-Display Preparation Processing of Charging Information Screen]

FIG. 6 is a flowchart showing a flow of pre-display preparation processing from the activation of a printer driver in the PC 100 until data necessary to start the display of the charging information screen unique to the present embodiment is generated and saved.

Triggered by a user specifying an output destination (operation to select a printer) at the time of printing application data that is created by Word, Excel, etc., the control unit 300 activates the printer driver for the selected printer at step S601.

At step S602, the transmission/reception unit 303 transmits a request for printer information on the printer selected by a user and receives a response for the request. Due to this, the transmission/reception unit 303 acquires printer information on the printer selected by a user. Here, in the case where the selected printer is the supported printer 101, the printer information includes information about the ON/OFF setting of the stepwise charging function and information about the ON/OFF setting of the charging information display/change function that are set by an administrator or the like, in addition to model type information indicating that the printer is the model type compatible with stepwise charging, which is information unique to the printer. In the case where the selected printer is the unsupported printer 102, model type information indicating that the printer is the model type incompatible with stepwise charging is included in the printer information.

At step S603, the control unit 300 saves the image adjustment setting value (default value) relating to the printing-target application data in the first memory 3040.

At step 604, the control unit 300 determines whether or not the selected printer is the model type compatible with stepwise charging, the setting of the stepwise charging function is ON, and the setting of the charging information display/change function is ON based on the printer information which is obtained at step S602. In the case where the results of the determination indicate that conditions are satisfied (in the case of Yes), the processing proceeds to step S605, and in the case where at least one of the conditions is not satisfied (in the case of No), the processing proceeds to step S616.

At step S605, the control unit 300 creates a printer driver setting screen (property screen) and displays the screen on a display unit, not shown. FIG. 7A is a diagram showing an example of the property screen of the supported printer 101 (Printer001). On a property screen 700, a Basic setting tab, a Page setting tab, a Finish tab, a Sheet feed tab, and a Print quality tab exist and the property screen 700 is in the state where the Basic setting tab is selected immediately after the screen is displayed. It is possible for a user to specify the number of copies, the sheet size, etc. via the property screen 700. Further, on the property screen 700, a checkbox 701, an OK button 702, and a Cancel button 703 exist. The checkbox 701 is an input item that is displayed on a user interface screen and which is checked by a user in the case where the user desires charging information to be displayed. It may also be possible to use a button, a pull-down menu, etc., as the input item in place of the checkbox. The OK button 702 is a button to fix the setting being displayed and to advance the operation. The Cancel button 703 is a button to discard the setting being displayed and return the contents of setting to those immediately before the property screen 700 being displayed currently is displayed.

In the case where a user presses down the OK button 702, at step S606, the control unit 300 determines whether or not the checkbox 701 is checked. In the case where the results of the determination indicate that the checkbox 701 is checked, the processing proceeds to step S607 and in the case where the checkbox 701 is not checked, the processing proceeds to step S617.

At step S607, the control unit 300 acquires data of the first page that is included in the printing-target application data, and generates RGB bitmap image data of the first page by rendering and converts the RGB bitmap image data into CMYK bitmap image data. It may also be possible to use a common method, such as a method using interpolation based on an already-existing conversion table and a method using a matrix operation, for the conversion from RGB bitmap image data into CMYK bitmap image data. The CMYK bitmap image data of the first page thus generated is saved in the first memory 3040.

As to the processing at step S607 and at subsequent steps, the processing for the data of the first page (step S608 to S610) and the processing for the data of the second and subsequent pages (steps S611 to S615) are performed in parallel.

At step S608, the image adjustment processing unit 301 performs the image adjustment processing including the toner reduction processing on the CMYK bitmap image data of the first page. This image adjustment processing will be described later.

At step S609, the toner consumption amount adjustment unit 302 calculates the toner consumption amount that is necessary in the case where printing processing is performed on the CMYK bitmap image data after the toner reduction processing of the first page that is generated at step S608. Specifically, the toner consumption amount that is necessary in the case where printing processing is performed on the CMYK bitmap image data after the toner reduction processing of the first page is calculated based on the relationship between each value of CMYK and the toner consumption amount for each pixel of the CMYK bitmap image data, and the sum of the toner consumption amounts of all the pixels is found. For example, at the time of calculating the toner consumption amount for each pixel, in the case where the relationship between each value of CMYK and the toner consumption amount is linear and the linear relationship is the same between CMYK, it may also be possible to take the total value of CMYK values as the toner consumption amount. Then, the calculated toner consumption amount and the CMYK bitmap image data after the toner reduction processing of the first page associated therewith are saved in the second memory 3041.

At step S610, the control unit 300 acquires the CMYK bitmap image data after the toner reduction processing of the first page and the toner consumption amount associated therewith from the second memory 3041.

After the processing hitherto performed, processing (print data transmission processing accompanied by the display of charging information) shown in FIG. 10, to be described later, follows.

As described above, at steps S611 to S615, the processing for the second and subsequent pages that are included in the printing-target application data is performed in parallel to the processing for the first page.

At step S611, the control unit 300 sequentially acquires the data of the second and subsequent pages that are included in the printing-target application data, generates RGB bitmap image data by rendering, and converts the RGB bitmap image data into CMYK bitmap image data. The CMYK bitmap image data of the pages to be processed (hereinafter, processing-target pages) thus generated is saved in the first memory 3040.

At step S612, the image adjustment processing unit 301 performs the image adjustment processing including the toner reduction processing on the CMYK bitmap image data of the processing-target pages.

At step S613, the toner consumption amount adjustment unit 302 calculates the toner consumption amount that is necessary for the printing processing of the CMYK bitmap image data after the toner reduction processing of the processing-target pages, which is generated at step S612. Then, the calculated toner consumption amount and the CMYK bitmap image data after the toner reduction processing of the processing-target pages, which is associated therewith, are saved in the second memory 3041.

At step S614, the control unit 300 determines whether or not the processing has been completed up to the final page of the printing-target application data. In the case where the results of the determination indicate that the processing has been completed up to the final page, after receiving a user's input on a charging information basic screen that is displayed at step 1001 in FIG. 10, to be described later, the processing proceeds to step S1002 (details will be described later). On the other hand, in the case where there is a page on which the processing has not been performed yet, after updating the processing-target page to the next page at step S615, the processing returns to step S611 and the processing is continued.

In the case where the processing is completed up to the final page, the CMYK bitmap image data and the toner consumption amount for each page of the printing-target application data are associated with each other and saved in the second memory 3041 for all the pages. In the case where the printing-target application data includes only one page, the processing at steps S611 to S615 is not performed.

Here, for the time being, explanation is returned to the case where the results of the determination at step S604 are No.

At step S616, the control unit 300 creates a property screen and displays the property screen on the display unit, not shown. FIG. 7B is a diagram showing an example of the property screen of the unsupported printer 102 (Printer002). On a property screen 704, a checkbox, which is checked in the case where a user desires charging information to be displayed, does not exist. In the case where a user presses down an OK button 705, the processing proceeds to step S617.

At step S617, the control unit 300 acquires data of all the pages that are included in the application data, generates RGB bitmap image data of all the pages by rendering, and converts the RGB bitmap image data into CMYK bitmap image data. The generated CMYK bitmap image data of all the pages is saved in the first memory 3040. After the processing hitherto performed, the print data transmission processing, which is performed by the PC 100, to transmit the image data for printing on which the necessary image adjustment processing has been performed to the printer 101/102 specified by a user follows. The print data transmission processing will be described later.

[Image Adjustment Processing]

Figure 8:
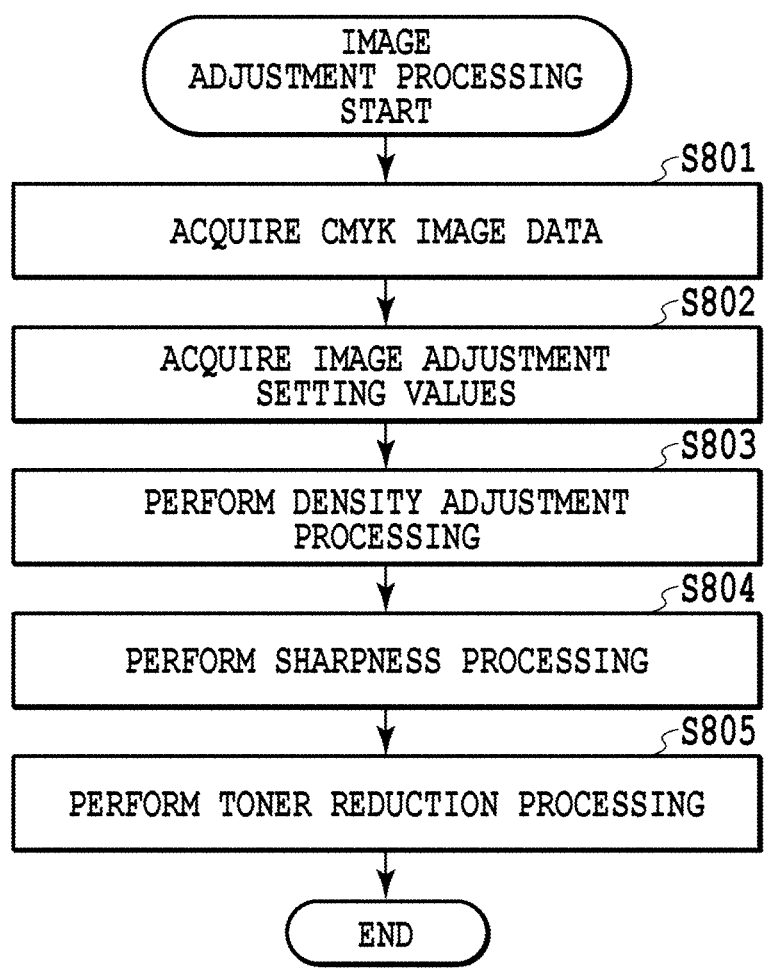
FIG. 8 is a flowchart showing a flow of image adjustment processing.
Figure 15B:
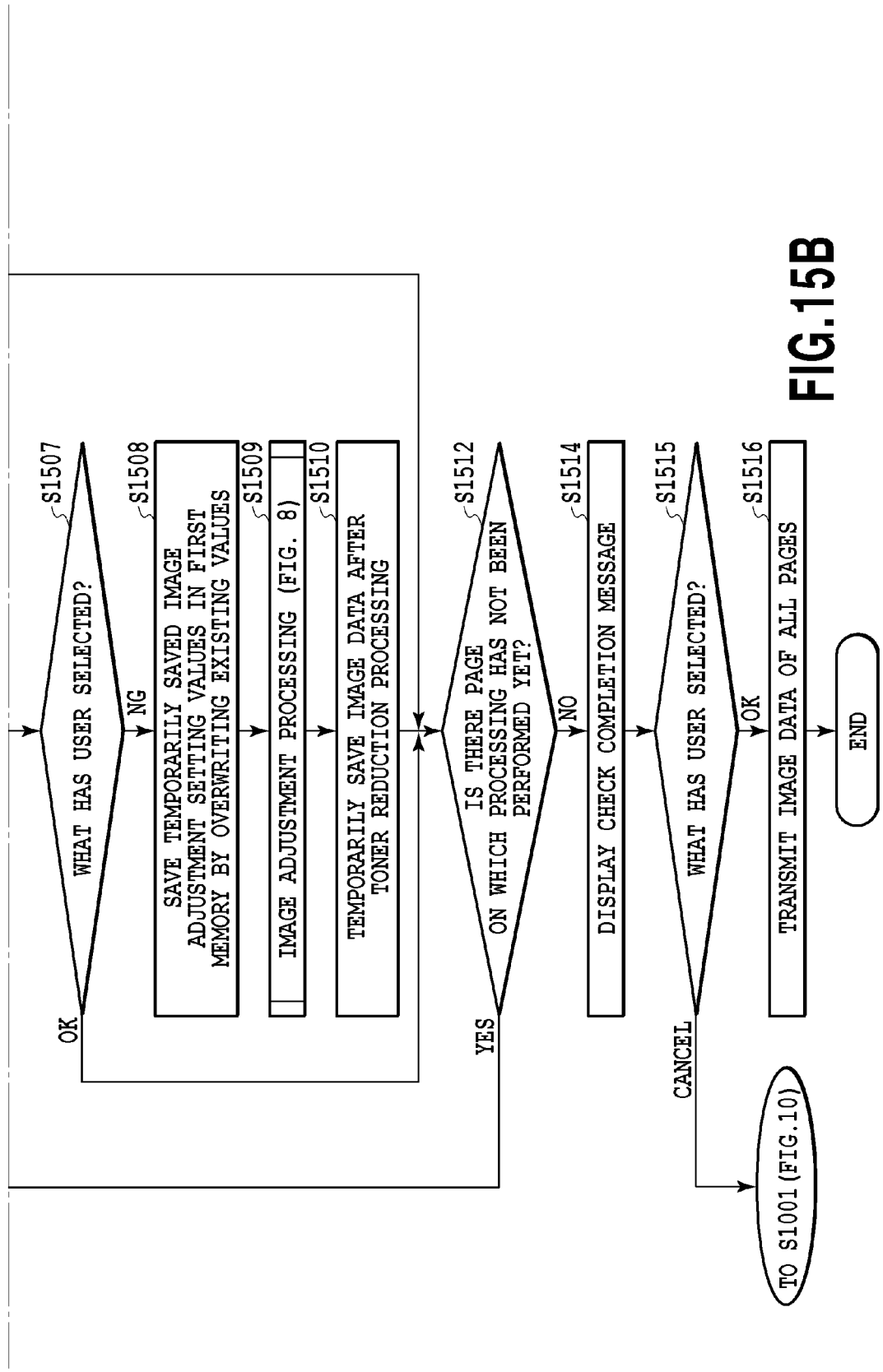

FIG. 8 is a flowchart showing a flow of image adjustment processing at step S608 and step S612 in FIG. 6 described previously, at step S901 in FIG. 9, to be described later, at step S1007 in FIG. 10, to be described later, and steps S1504 and S1509 in FIG. 15, to be described later.

At step S801, the image adjustment processing unit 301 acquires the CMYK bitmap image data of the processing-target page from the first memory 3040. For example, at step S608, the CMYK bitmap image data of the first page is acquired and at step S612, the CMYK bitmap image data of the second page and subsequent processing-target pages is acquired. The acquired CMYK bitmap image data is first sent to the density adjustment processing unit 400.

At step S802, the image adjustment processing unit 301 acquires the image adjustment setting values for the processing-target page from the first memory 3040. The image adjustment setting values that are acquired here include the density adjustment setting value and the sharpness adjustment setting value, and the density adjustment setting value is sent to the density adjustment processing unit 400 and the sharpness adjustment setting value is sent to the sharpness processing unit 401.

At step S803, the density adjustment processing unit 400 performs density adjustment processing in accordance with the density adjustment setting value on the received CMYK bitmap image data. The CMYK bitmap image data on which the density adjustment processing has been performed is sent to the sharpness processing unit 401.

At step S804, the sharpness processing unit 401 performs sharpness processing in accordance with the sharpness adjustment setting value on the CMYK bitmap image data on which the density adjustment processing has been performed. The CMYK bitmap image data on which the sharpness processing has been performed is sent to the toner reduction processing unit 402.

At step S805, the toner reduction processing unit 402 performs toner reduction processing on the CMYK bitmap image data on which the sharpness processing has been performed. As described previously, the CMYK bitmap image data after the toner reduction processing is saved in the second memory 3041.

The above is the contents of the image adjustment processing.

[Print Data Transmission Processing]

Figure 9:
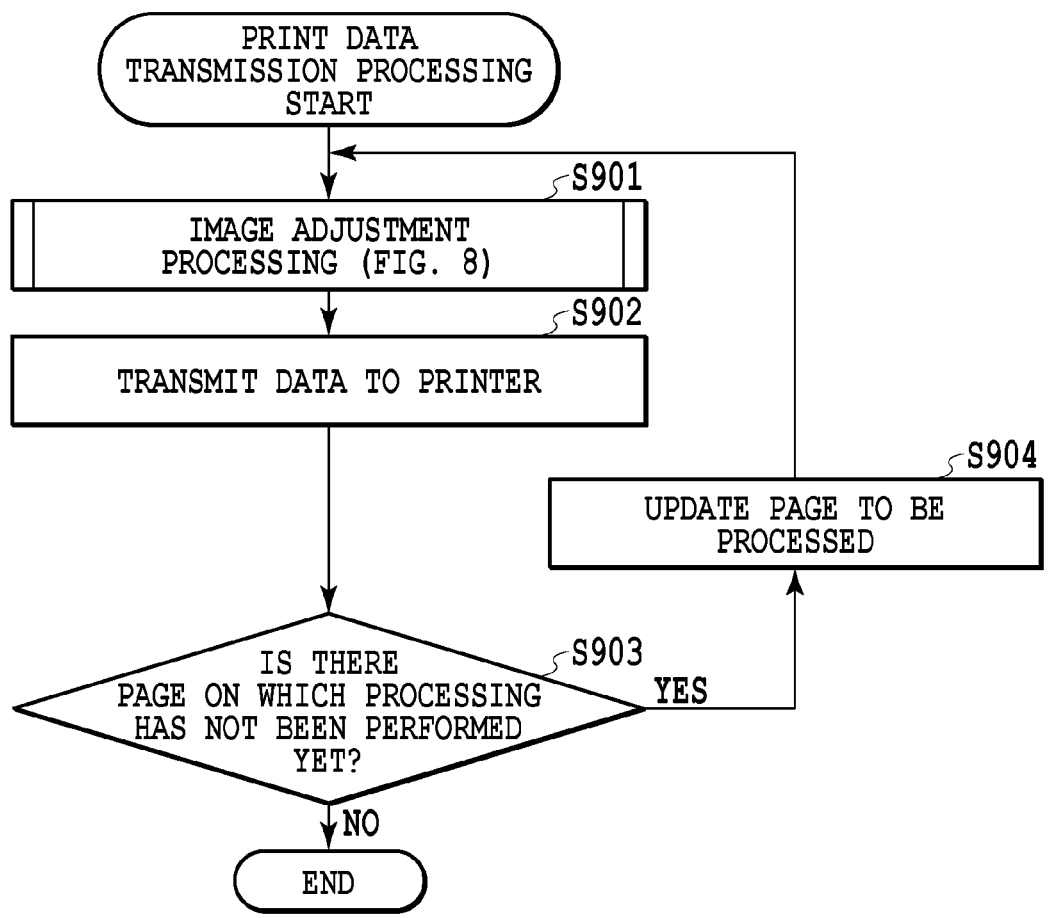
FIG. 9 is a flowchart showing a flow of print data transmission processing.

FIG. 9 is a flowchart showing a flow of processing to transmit print data to a printer that is specified as an output destination by a user, which is performed after step S617 or the like in the flow in FIG. 6 described previously.

At step S901, the image adjustment processing unit 301 performs the previously described image adjustment processing (see FIG. 8) on the CMYK bitmap image data of the processing-target pages of the CMYK bitmap image data of all the pages of the application data for which printing is instructed. In this case, normally, the first page is the first processing-target page and after this, the processing is performed on the subsequent pages up to the final page in order. The CMYK bitmap image data on which the image adjustment processing has been performed is sent to the transmission/reception unit 303.

At step S902, the transmission/reception unit 303 transmits the CMYK bitmap image data (print data) of the processing-target pages on which the image adjustment processing has been performed to the printer (in the present embodiment, the supported printer 101 or the unsupported printer 102) that is specified as the output destination by a user.

At step S903, the control unit 300 determines whether or not the processing has been completed for all the pages of the application data for which printing is instructed. In the case where the results of the determination indicate that there is a page on which the processing has not been performed yet, after updating the processing-target page to the next page at step S904, the processing returns to step S901 and the processing is continued. On the other hand, in the case where the results of the determination indicate that the image adjustment processing and the print data transmission processing have been completed up to the final page, the present processing is terminated.

After the above processing is terminated, the state is brought about where the transmission of the CMYK bitmap image data of all the pages on which the image adjustment processing has been performed to the printer that is specified as the output destination by a user is completed.

The above is the contents of the print data transmission processing.

[Print Data Transmission Processing Accompanied by Display of Charging Information]

Figure 10B:
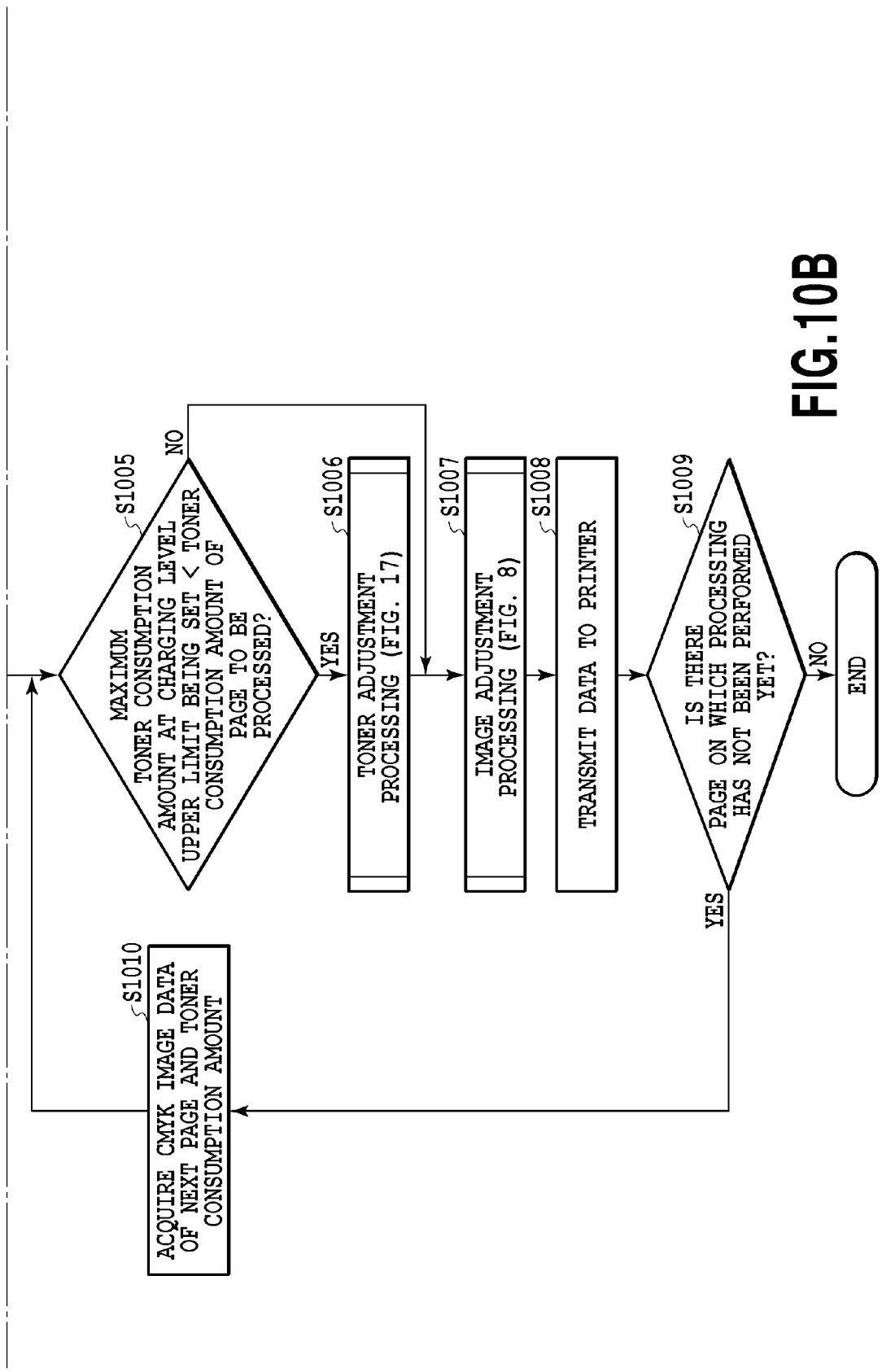

FIG. 10 is a flowchart showing a flow of the display processing of a charging information screen including charging information (e.g., see FIG. 2), which is performed after the previously described pre-display preparation processing, i.e., after step S610 in the flow in FIG. 6, and the processing to transmit print data to the printer (in the present embodiment, the supported printer 101) in the case where the display processing is performed.

Figure 11:
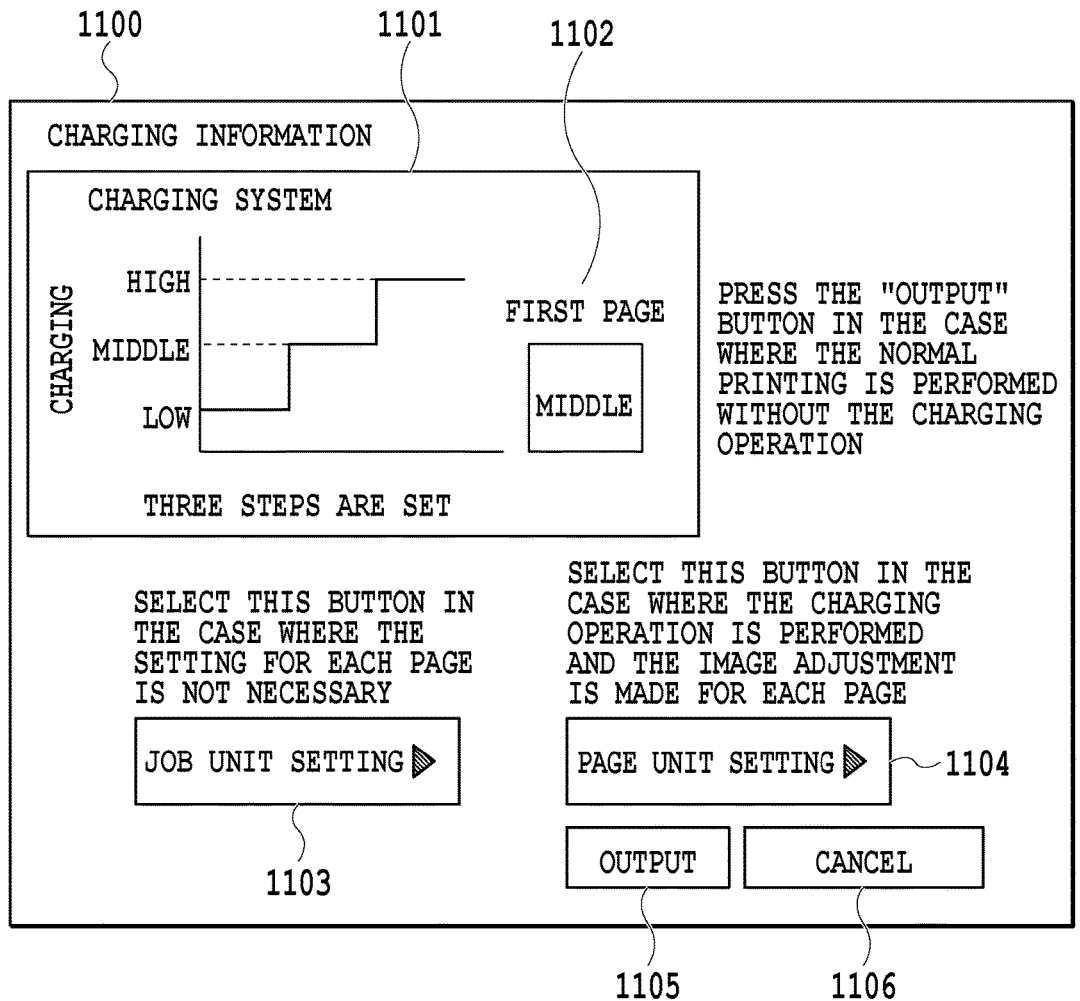
FIG. 11 is an example of a charging information basic screen.

At step S1001, the control unit 300 creates a charging information screen and display the charging information screen on the display unit, not shown. FIG. 11 is a diagram showing an example of the most basic screen (hereinafter, charging information basic screen) for presenting charging information to a user. On a charging information basic screen 1100, a Charging system display area 1101 showing a charging system of stepwise charging exists. Inside the Charging system display area 1101, a charging level display area 1102 showing a charging level (in the example in FIG. 11, "Middle") corresponding to the toner consumption amount that is necessary to print the first page of data to be printed (hereinafter, printing-target data) is included. The charging level is derived based on the image adjustment setting values at the present point in time. Further, on the charging information basic screen 1100, a job unit setting button 1103 and a page unit setting button 1104 exist. The job unit setting button 1103 is a button that is used in the case where a user desires a charging setting for each job and pressing-down thereof displays a job unit setting screen, to be described later. The page unit setting button 1104 is a button that is used in the case where a user desires a charging setting for each page and pressing-down thereof displays a page unit setting screen, to be described later. Further, on the charging information basic screen 1100, an Output button 1105 and a Cancel button 1106 exist. The Output button 1105 is a button that is used in the case where a user gives instructions to print an output and the printing processing starts by the pressing-down thereof. The Cancel button 1106 is a button that is used in the case where a user desires to cancel the contents of the current charging setting, and the contents of the setting are brought into the default state (state where no charging setting is performed) by the pressing-down thereof, and the previously described property screen 700 is displayed in place of the charging information basic screen 1100. In the example in FIG. 11, the number of steps of the charging level is three, but it is possible to set an arbitrary number of steps. In the example in FIG. 11, the charging level is represented by words "High", "Middle", and "Low", but it may also be possible to represent the charging level by, for example, numerical values or the like.

Explanation is returned to the flow in FIG. 10.

In the case where it is determined that the processing is completed up to the final page at step S614 in FIG. 6 described previously, and the user's selection on the charging information basic screen that is displayed at step S1001 is received, the control unit 300 determines which processing has been selected by a user at step S1002. In other words, in the case where the job unit setting button 1103 has been pressed down, the processing proceeds to step S1003. On the other hand, in the case where the page unit setting button 1104 has been pressed down, the processing proceeds to step S1011. In the case where the Output button 1105 has been pressed down, the processing proceeds to step S901 in FIG. 9 described previously and the print data transmission processing is performed. Although not shown in the flow in FIG. 10, in the case where the Cancel button 1106 has been pressed down, as described previously, the display is switched to the property screen 700. For the data of the second and subsequent pages other than the data of the first page, the processing that is performed afterward is switched depending on the user's selection at this step. In other words, for the data of the second and subsequent pages, in the case where job unit setting has been selected, the processing after step S1003 is performed, in the case where page unit setting has been selected, the processing after step S1011 is performed, and in the case where Output has been selected, the previously described print data transmission processing (see FIG. 9) is performed.

Figure 12A:
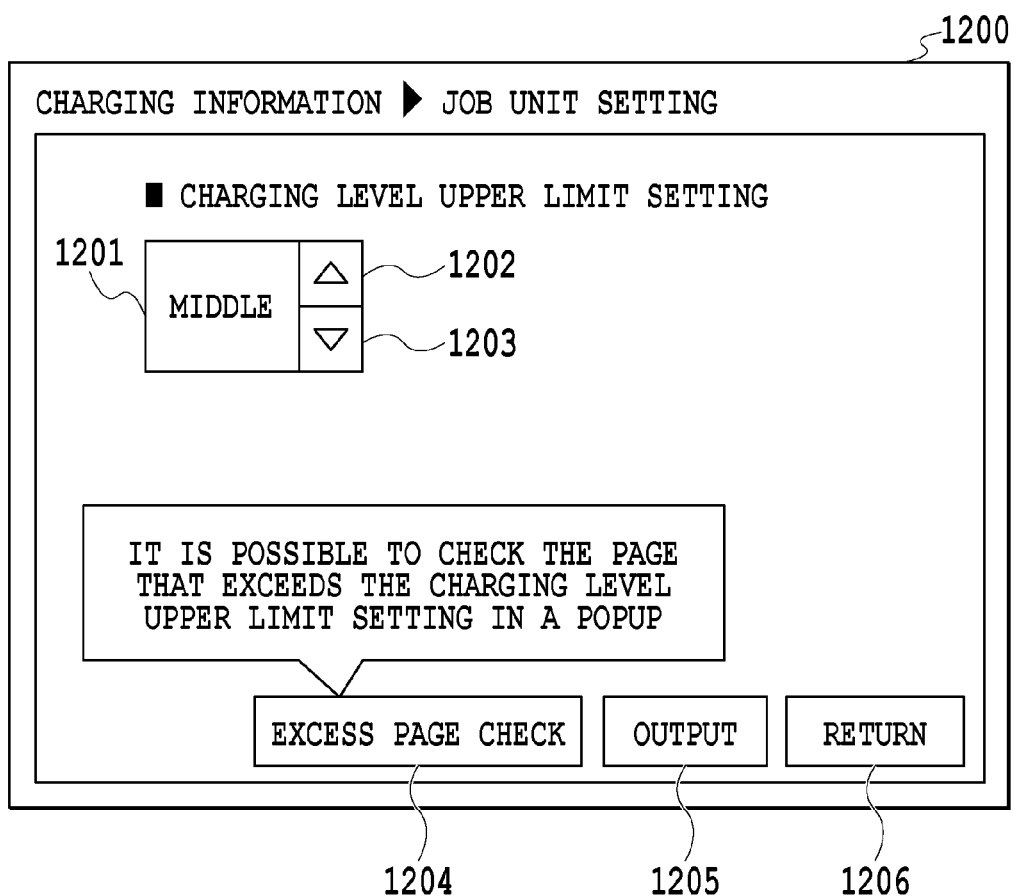
FIG. 12A is an example of a job unit setting screen and FIG. 12B and FIG. 12C are each an example of a screen relating to a job unit setting.

At step S1003, the control unit 300 creates a job unit setting screen and displays the job unit setting screen on the display unit, not shown. FIG. 12A is a diagram showing an example of the job unit setting screen. On a job unit setting screen 1200 shown in FIG. 12A, an area (hereinafter, Charging level upper limit setting area) 1201 that displays the upper limit of the charging level being set exists and to the right thereof, a button 1202 to increase the upper limit of the charging level and a button 1203 to decrease the upper limit of the charging level exist. Here, the setting of the charging level to "upper limit" means that, for example, in the case where the toner consumption amount that is necessary for the printing processing of a certain page corresponds to the charging level "High", the toner consumption amount is decreased to the level of "Middle", but in the case where the toner consumption amount that is necessary for the printing processing of a certain page corresponds to the charging level "Low", it is not necessary to increase the toner consumption amount to the level of "Middle" by wastefully spending effort and time. As described previously, in the present embodiment, the charging levels in three steps, i.e., "High", "Middle", and "Low" exist (see FIG. 11). Consequently, in the case where the button 1202 to increase the upper limit is pressed down in the state shown in FIG. 12A, the upper limit of the charging level changes to "High" and at the same time, the button 1202 to increase the upper limit becomes ineffective (e.g., the button 1202 to increase the upper limit is displayed in the grayed-out state). Further, in the case where the button 1203 to decrease the upper limit is pressed down in the state shown in FIG. 12A, the upper limit of the charging level changes to "Low" and at the same time, the button 1203 to decrease the upper limit becomes ineffective (e.g., the button 1203 to decrease the upper limit is displayed in the grayed-out state). On the job unit setting screen 1200, an Excess page check button 1204, an Output button 1205, and a Return button 1206 also exist. In the case where the Output button 1205 is pressed down, the processing to print an output while automatically performing the toner adjustment processing is started so that the toner consumption amount that is necessary for the printing becomes equal to or less than a maximum toner consumption amount in accordance with the upper limit of the charging level specified at that point in time for all the pages of the print data. On the other hand, in the case where the Return button 1206 is pressed down, the job unit setting is aborted and the display is switched to the charging information basic screen 1100. However, at this time, the upper limit setting of the charging level, which is displayed in the Charging level upper limit setting area 1201, is maintained. The Excess page check button 1204 is a button that is used in the case where a user desires to check the page (hereinafter, excess page) that exceeds the upper limit of the charging level that is set. In the case where the Excess page check button 1204 is pressed down, it is made possible to check the page that exceeds the maximum toner consumption amount in accordance with the upper limit of the charging level specified at that point in time in the Charging level upper limit setting area 1201 through a preview image. Details of the preview image will be described later.

Explanation is returned to the flow in FIG. 10.

At step S1004, the control unit 300 receives a user's selection on the above-described job unit setting screen 1200. In the case where the Excess page check button 1204 has been pressed down, the processing proceeds to the flow in FIG. 15, to be described later, and excess page check processing is performed. The excess page check processing will be described later. In the case where the Output button 1205 has been pressed down, the processing proceeds to step S1005. Although not shown in the flow in FIG. 10, in the case where the Return button 1206 has been pressed down, as described above, the display is switched to the charging information basic screen 1100.

At step S1005, the control unit 300 determines whether or not the toner consumption amount of the processing-target page is larger than the maximum toner consumption amount in accordance with the upper limit of the charging level that is set in the Charging level upper limit setting area 1201. In the case where the results of the determination indicate that the toner consumption amount of the processing-target page is larger than the maximum toner consumption amount, the processing proceeds to step S1006 and in the case where the toner consumption amount of the processing-target page is equal to or less than the maximum toner consumption amount, the processing proceeds to step S1007.

At step S1006, the toner consumption amount adjustment unit 302 performs toner adjustment processing so as to suppress the toner consumption amount of the processing-target page to or less than the maximum toner consumption amount in accordance with the upper limit of the charging level that is set in the Charging level upper limit setting area 1201. The toner adjustment processing will be described later. The CMYK bitmap image data on which the toner adjustment processing has been performed is sent to the image adjustment processing unit 301.

At step S1007, the image adjustment processing unit 301 performs the previously described image adjustment processing (see FIG. 8) on the CMYK bitmap image data. The CMYK bitmap image data on which the image adjustment processing has been performed is sent to the transmission/reception unit 303.

At step S1008, the transmission/reception unit 303 transmits the CMYK bitmap image data on which the image adjustment processing has been performed to the supported printer 101.

At step S1009, the control unit 300 determines whether or not the print data transmission processing has been completed for all the pages of the application data for which printing is instructed. In the case where the results of the determination indicate that there is a page on which the processing has not been performed yet, the processing proceeds to step S1010 and in the case where the print data transmission processing has been completed up to the final page, the print data transmission processing is terminated.

At step S1010, the control unit 300 sets the next page to be the processing-target page and acquires the CMYK bitmap image data of the processing-target page that is set and the toner consumption amount associated therewith from the second memory 3041. After the control unit 300 acquires the CMYK bitmap image data of the processing-target page and the toner consumption amount associated therewith, the processing returns to step S1005 and the processing at steps S1005 to S1008 is performed on the processing-target page.

The processing up to this processing is the print data transmission processing accompanied by the display of charging information in the case where a user has selected the job unit setting on the charging information basic screen 1100 (in the case of S1002→S1003).

Subsequently, the case where a user has selected the page unit setting on the charging information basic screen 1100 (in the case of S1002→S1011) is explained.

Figure 13A:
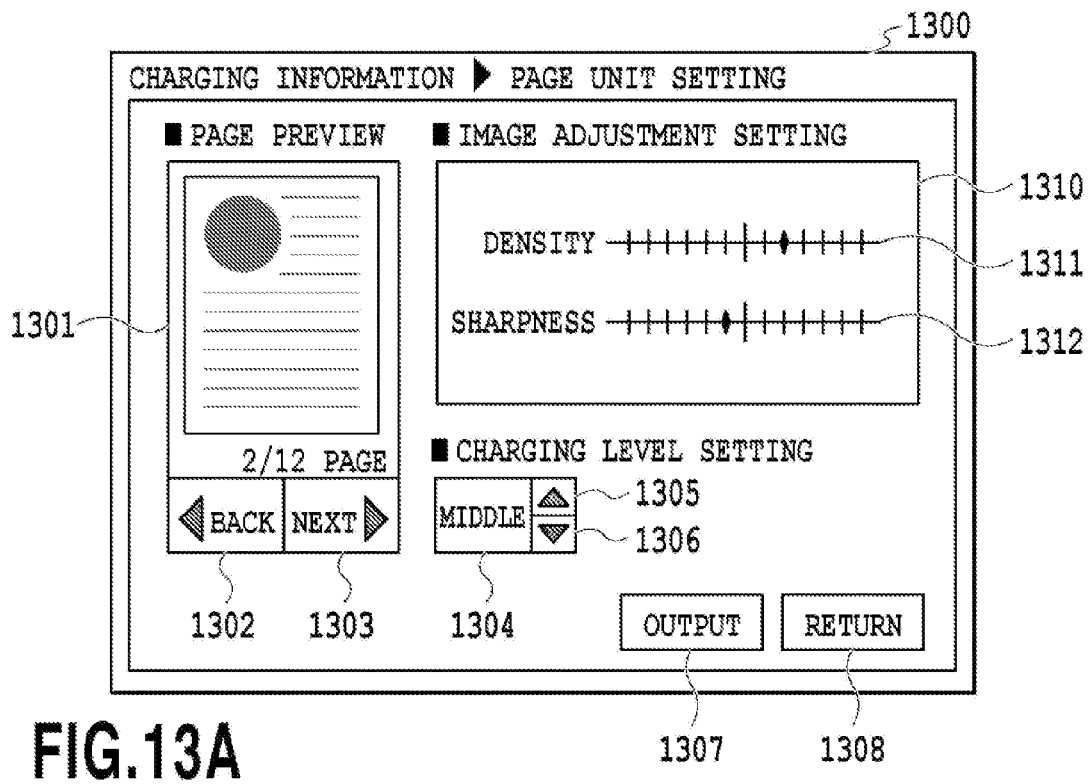
FIG. 13A and FIG. 13B are each an example of a page unit setting screen.

At step S1011, the control unit 300 creates a page unit setting screen and displays the page unit setting screen on the display unit, not shown. FIG. 13A is a diagram showing an example of a page unit setting screen. On a page unit setting screen 1300 shown in FIG. 13A, a Page preview area 1301 and two buttons that switch pages (a Back button 1302 and a Next button 1303) exist. By a user pressing the two buttons, it is possible to switch the target pages for which a preview display is produced (target for which the charging level setting and the image adjustment setting are changed).

Further, on the page unit setting screen 1300, an area (Charging level setting area) 1304 for displaying and setting the charging level of the page being displayed exists, and to the right thereof, a button 1305 to increase the charging level and a button 1306 to decrease the charging level exist. As described previously, in the present embodiment, the charging levels in three steps, i.e., "High", "Middle", and "Low" exist (see FIG. 11). Consequently, in the case where the button 1305 to increase the charging level is pressed down in the state shown in FIG. 13A, the charging level changes to "High" and at the same time, the button 1305 to increase the charging level becomes ineffective (e.g., the button 1305 to increase the charging level is displayed in the grayed-out state). In the case where the button 1306 to decrease the charging level is pressed down in the state shown in FIG. 13A, the charging level changes to "Low" and at the same time, the button 1306 to decrease the charging level becomes ineffective (e.g., the button 1306 to decrease the charging level is displayed in the grayed-out state). It may also be possible to display the charging amount itself in addition to the charging level in the Charging level setting area 1304. Further, it may also be possible to provide an area for displaying and setting the charging amount itself as an alternative area to the Charging level setting area 1304.

On the page unit setting screen 1300, an Image adjustment setting area 1310 further exists and inside thereof, a Density adjustment slide bar 1311 and a Sharpness adjustment slide bar 1312 exist. In the case where a user desires to adjust the density of an output image, it is possible to set the density adjustment setting value to a desired value by sliding a pointer on the Density adjustment slide bar 1311. Similarly, in the case where a user desires to adjust the sharpness of an output image, it is possible to set the sharpness adjustment setting value to a desired value by sliding a pointer on the Sharpness adjustment slide bar 1312.

Besides the above, on the page unit setting screen 1300, an Output button 1307 and a Return button 1308 exist. In the case where the Output button 1307 is pressed down, the image adjustment setting values that are set to each page at that point in time are fixed and the printing outputs of all the pages is started. On the other hand, in the case where the Return button 1308 is pressed down, the page unit setting is aborted and the display is switched to the charging information basic screen 1100. However, at this time, the settings that are performed via the page unit setting screen 1300 are maintained.

Figure 13B:
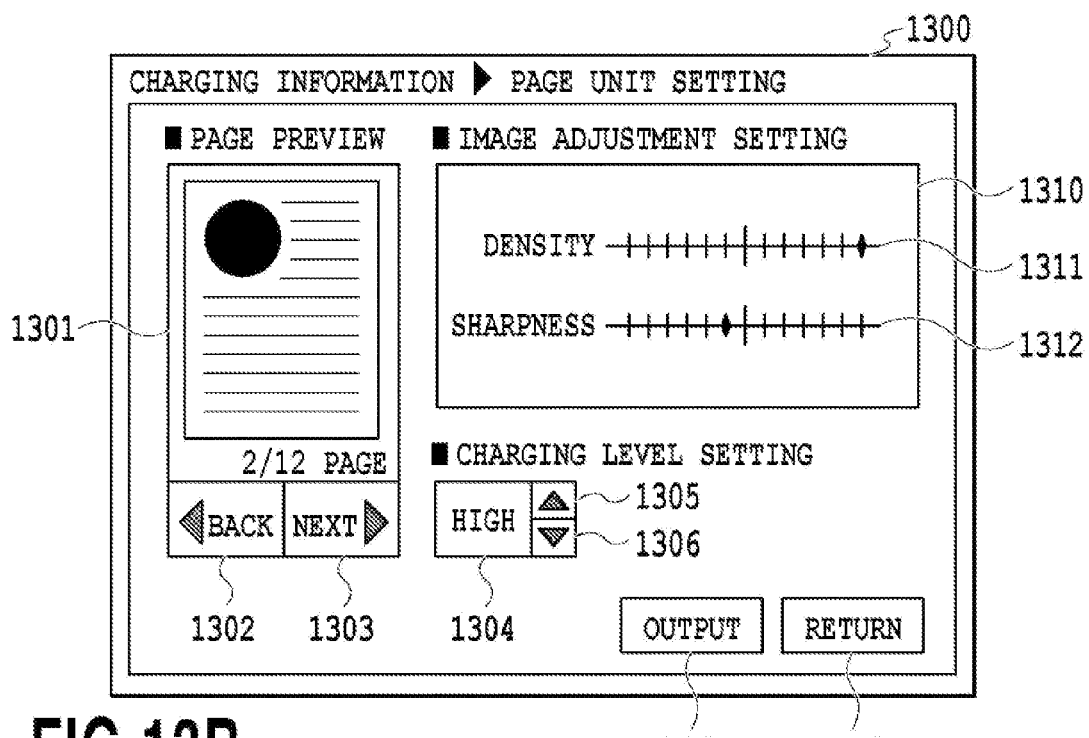

On the page unit setting screen 1300, it is possible to repeatedly change the charging level setting and the image adjustment setting for the processing-target page being displayed in a preview, and the display of those settings is updated in an interlocking manner. For example, it is assumed that the pointer on the Density adjustment slide bar 1311 is slid toward the right side (high density side) as shown in FIG. 13B from the state shown in FIG. 13A. In this case, the page in the preview is displayed more densely than that in FIG. 13A and the setting of the charging level is changed from "Middle" to "High" in an interlocking manner in accordance with the change of the image adjustment setting.

Figure 14A:
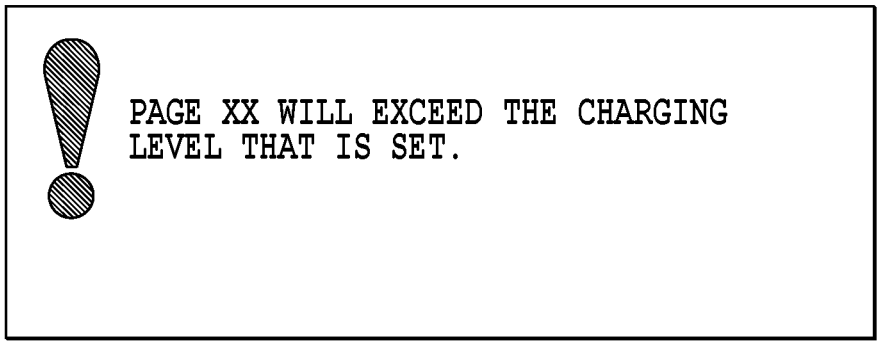
FIG. 14A and FIG. 14B are each an example of a warning screen.

In the case where the charging level setting and the image adjustment setting are interlocked with each other as described above, there is a possibility that the change of one of the settings will cause the setting value of the other setting to exceed a permissible range (range in which the setting can be performed). For example, in an attempt to change the setting of the charging level for a certain page to the lowest level ("Low" in the present embodiment), the case is supposed where the toner consumption amount that is necessary for printing exceeds the maximum toner consumption amount that is permitted at the charging level "Low" even by adjusting the image adjustment setting values, such as the density adjustment setting value, to the maximum. In such a case, a warning screen as illustrated in FIG. 14A is displayed in a popup and each image adjustment setting value is returned to the default value and at the same time, the charging level is set to a level that is derived based on the default value. After this, the above-described warning screen disappears and the display of the page unit setting screen 1300 is updated.

Explanation is returned to the flow in FIG. 10.

After step S1011, the control unit 300 performs setting processing for each page (hereinafter, page unit setting processing). The page unit setting processing will be described later.

The above is the contents of the print data transmission processing in the case where the charging information is displayed.

[Excess Page Check Processing]

Subsequently, excess page check processing that is performed in the case where a user desires to check an excess page in the job unit setting (Yes at step S1004 in the flow in FIG. 10 described previously) is explained in detail. FIG. 15 is a flowchart showing a flow of the excess page check processing.

At step S1501, the control unit 300 determines whether or not the toner consumption amount that is expected at the present point in time for the processing-target page is larger than the maximum toner consumption amount in accordance with the upper limit of the charging level that is set in the Charging level upper limit setting area 1201 on the job unit setting screen 1200. Normally, the processing-target page starts from the first page of the printing-target data and is sequentially updated to the second page, the third page, and so on. In the case where the results of the determination indicate that the toner consumption amount of the processing-target page is larger than the maximum toner consumption amount, the processing proceeds to step S1502 and in the case where the toner consumption amount of the processing-target page is equal to or less than the maximum toner consumption amount, the processing proceeds to step S1511.

At step S1502, the control unit 300 reads the image adjustment setting values of the printing-target page from the first memory 3040 and temporarily saves the values in the RAM or the like within the control unit 300.

At step S1503, the control unit 300 performs the toner adjustment processing, to be described later.

At step S1504, the image adjustment processing unit 301 performs the previously described image adjustment processing (see the flow in FIG. 8).

At step S1505, the control unit 300 temporarily stores the CMYK bitmap image data on which the toner reduction processing has been performed in the RAM or the like within the control unit 300.

Figure 12B:
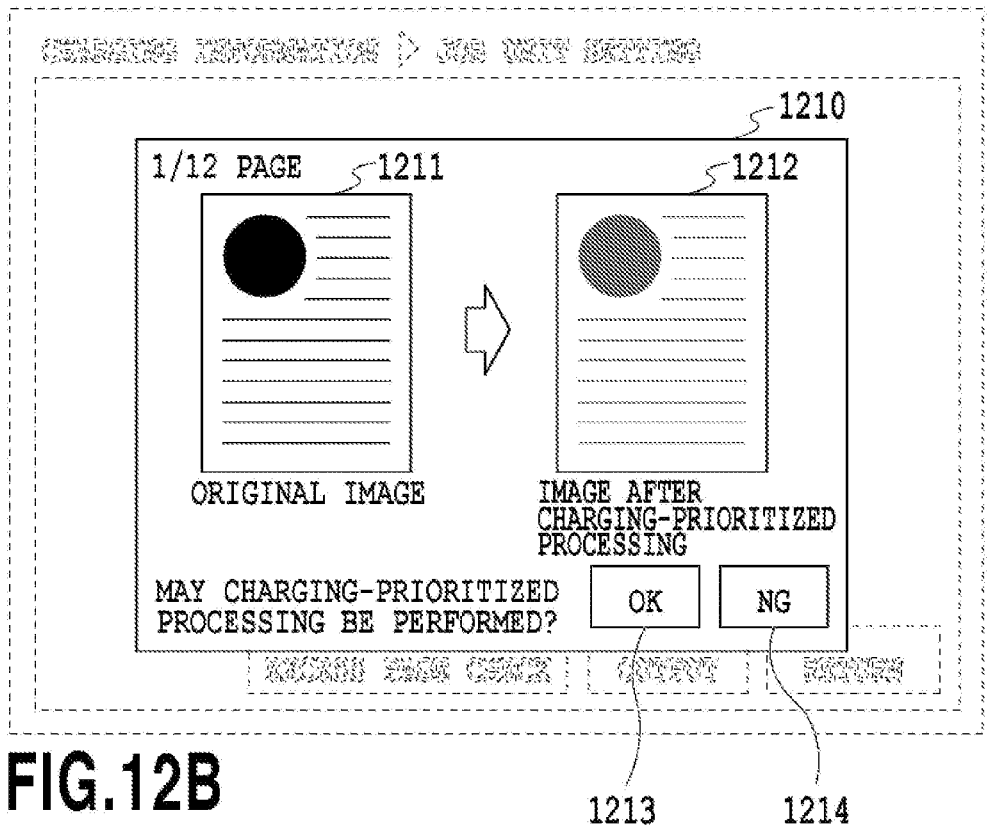
Figure 12C:
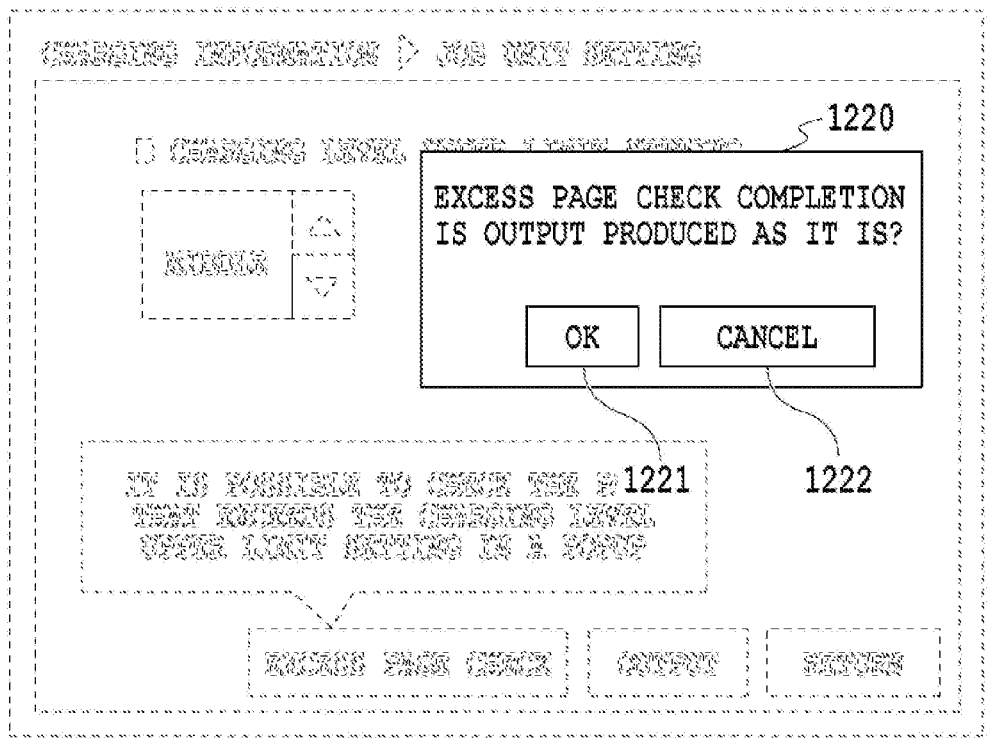

At step S1506, the control unit 300 creates a preview screen and displays the preview screen on the display unit, not shown. FIG. 12B is a diagram showing an example of the preview screen that is displayed in a popup in accordance with the pressing-down of the Excess page check button 1204 within the job unit setting screen 1200. An area 1211 within a preview screen 1210 is an area where a preview display of an original image is produced and an image in the case where the normal printing processing is performed in the state where the upper limit of the charging level that is set is exceeded is displayed. An area 1212 within the preview screen 1210 is an area where a preview display of an image on which charging level prioritized processing has been performed and an image in the case where the printing processing is performed after the toner adjustment processing is performed so that the tone consumption amount becomes equal to or less than the maximum toner consumption amount in accordance with the upper limit of the charging level that is set is displayed. A user compares these two images and selects a desired image. In other words, in the case where the user desires to print the image on which the charging level prioritized processing has been performed, the user presses down an OK button 1213 and in the case where the user desires to print the original image, the user presses down an NG button 1214. In the case where the OK button 1213 or the NG button 1214 is pressed down, on a condition that another excess page exists, the popup display is produced similarly for the next excess page. On the other hand, in the case where no excess page exists, the popup display of an excess page check completion screen as illustrated in FIG. 12C is produced. The excess page check completion screen will be described later.

At step S1507, the control unit 300 receives a user's input on the above-described preview screen 1210 and determines which of the OK button 1213 and the NG button 1214 has been pressed down. In the case where the results of the determination indicate that the OK button 1213 has been pressed down, the processing proceeds to step S1512 and in the case where the NG button 1214 has been pressed down, the processing proceeds to step S1508.

At step S1508, control unit 300 saves the image adjustment setting values (i.e., image adjustment setting values relating to the original image (image before toner adjustment processing) of the processing-target page) that are saved temporarily at step S1502 in the first memory 3040 by overwriting the existing values.

At step S1509, the image adjustment processing unit 301 performs the previously described image adjustment processing (see the flow in FIG. 8).

At step S1510, the control unit 300 temporarily stores the CMYK bitmap image data after the toner reduction processing has been performed at step S1509 in the RAM or the like within the control unit 300. At this time, the data that is temporarily saved is saved by overwriting the data that has been temporarily saved at step S1505. After step S1510, the processing proceeds to step S1512.

In the case where it has been determined that the toner consumption amount of the processing-target page is equal to or less than the maximum toner consumption amount at step S1501 (No at step S1501), at step 1511, the control unit 300 acquires the CMYK bitmap image data of the processing-target page from the second memory 3041 and temporarily saves the data in the RAM or the like within the control unit 300. After step S1511, the processing proceeds to step S1512.

At step S1512, the control unit 300 determines whether or not the processing has been completed for all the pages of the application data for which printing is instructed. In the case where the results of the determination indicate that there is a page on which the processing has not been performed yet, the processing proceeds to step S1513 and in the case where the processing up to the final page has been completed, the processing proceeds to step S1514.

At step S1513, the control unit 300 sets the next page to be the processing-target page and acquires the CMYK bitmap image data of the processing-target page that is set and the toner consumption amount associated therewith from the second memory 3041. After this, the processing returns to step S1501 and the processing for the processing-target page is continued.

In the case where the processing up to the final page is completed, at step S1514, the control unit 300 creates a screen (excess page check completion screen) for notifying a user of the fact that the excess page check in the job unit setting has been completed and displays the screen in a popup on the display unit, not shown. FIG. 12C is a diagram showing an example of the excess page check completion screen. In the case where an OK button 1221 within an Excess page check completion screen 1220 is pressed down, the printing processing is started and in the case where a Cancel button 1222 is pressed down, the job unit setting is aborted and the processing proceeds to step S1001 in FIG. 10 and the charging information basic screen 1100 is displayed.

At step S1515, the control unit 300 determines which of the OK button 1221 and the Cancel button 1222 has been pressed down. In the case where the results of the determination indicate that the OK button 1221 has been pressed down, the processing proceeds to step S1516 and in the case where the Cancel button 1222 has been pressed down, the processing proceeds to step S1001 in FIG. 10 and the charging information basic screen 1100 is displayed.

At step S1516, the transmission/reception unit 303 transmits the CMYK bitmap image data of all the pages including the data of each page having been temporarily saved at any of step S1505, step S1510, and step S1511 to the supported printer 101 that is specified as the output destination by a user. Here, the data having been temporarily saved at step S1505 is the data of the page on which the toner adjustment processing has been performed. On the other hand, the data having been temporarily saved at step S1510 or step S1511 is the data of the page on which the toner adjustment process has not been performed.

In the example described above, the Excess page check button 1204 is effective at all times regardless of whether or not an excess page is included in the application data to be printed. However, in the case where no excess page is included in the application data to be printed, it may also be possible to set the Excess page check button 1204 to be ineffective by, for example, displaying the button in the grayed-out state or by not displaying the button.

The above is the contents of the excess page check processing.

[Page Unit Setting Processing]

Figure 16:
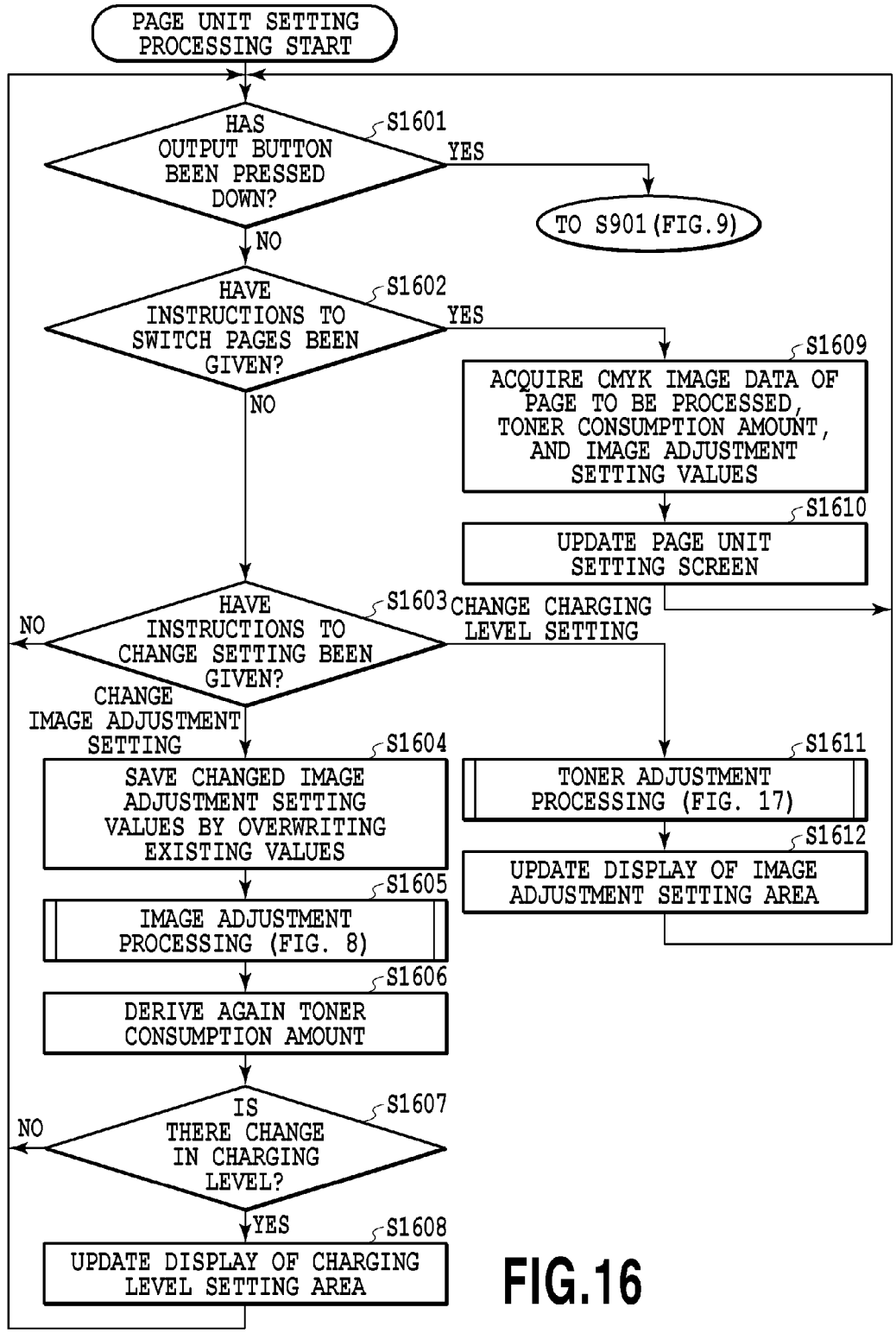
FIG. 16 is a flowchart showing a flow of page unit setting processing.

Subsequently, the page unit setting processing that is performed after step S1011 in the flow in FIG. 10 described previously is explained. FIG. 16 is a flowchart showing a flow of the page unit setting processing.

At step S1601, the control unit 300 receives a user's input on the page unit setting screen 1300 described previously and determines whether or not the Output button 1307 has been pressed down. In the case where the results of the determination indicate that the Output button 1307 has been pressed down, the processing proceeds to step S901 in FIG. 9 and the previously described print data transmission processing is performed and in the case where the Output button 1307 has not been pressed down, the processing proceeds to step S1602.

At step S1602, the control unit 300 determines whether or not the instructions to switch pages have been given (in the present embodiment, whether the Back button 1302 or the Next button 1303 has been pressed down). In the case where the results of the determination indicate that the instructions to switch pages have been given, the processing proceeds to step S1609 and in the case where the instructions to switch pages have not been given, the processing proceeds to step S1603.

At step S1603, the control unit 300 determines whether or not instructions to change some settings have been given. In the case where the instructions to change settings have not been given, the processing returns to step S1601 and in the case where the instructions to change the charging level setting have been given, the processing proceeds to step S1611 and in the case where the instructions to change the image adjustment setting have been given, the processing proceeds to step S1604.

At step S1604, the control unit 300 saves the image adjustment setting values after the change in the first memory 3040 by overwriting the existing values.

At step S1605, the image adjustment processing unit 301 performs the previously described image adjustment processing (see the flow in FIG. 8).

At step S1606, the toner consumption amount adjustment unit 302 derives again the toner consumption amount for the CMYK bitmap image data after the image adjustment processing has been performed at step S1605 for the processing-target page.

At step S1607, the control unit 300 determines the charging level corresponding to the toner consumption amount that is derived at step S1606 and determines whether or not the determined charging level is a charging level different from the charging level before the image adjustment setting is changed. In the case where the results of the determination indicate the there is no change in the charging level, the processing returns to step S1601 and in the case where there is a change in the charging level, the processing proceeds to step S1608.

At step S1608, the control unit 300 updates the charging level that is displayed in the Charging level setting area 1304. For example, the charging level being displayed in the Charging level setting area 1304 is changed from "Middle" to "High". After this, the processing returns to step S1601 and preparations are made for the next user's input.

In the case where the instructions to switch pages have been given on the page unit setting screen 1300 (Yes at step S1602), the page after the switching is set to be the processing-target page at step S1609. At this time, the image adjustment setting values for the processing-target page are acquired from the first memory 3040 and the CMYK bitmap image data for the processing-target page and the toner consumption amount associated therewith are acquired from the second memory 3041. Then, at step S1610 that follows, the new page unit setting screen 1300 on which the display in the Page preview area 1301 has been updated is created and displayed. At this time, the image for the page preview is generated from the CMYK bitmap image data that is acquired at step S1609 and at the same time, the charging level is determined from the acquired toner consumption amount. The preview image thus generated and the determined charging level are reflected as the contents that are displayed in the Page preview area 1301 and the Charging level setting area 1304 on the new page unit setting screen 1300. Further, in accordance with the acquired image adjustment setting values, the contents of the display within the Image adjustment setting area 1310 are also updated. For example, the pointer on the Density adjustment slide bar 1311 and the pointer on the Sharpness adjustment slide bar 1312 slide in accordance with the acquired image adjustment setting values. After the updating of the page unit setting screen 1300 is completed, the processing returns to step S1601 and preparations are made for the next user's input.

The case where the instructions to change the charging level setting have been given at step S1603 is explained. In this case, at step S1611, the toner consumption amount adjustment unit 302 performs the toner adjustment processing, to be described later, based on the charging level after the change. Then, at step S1612 that follows, the control unit 300 updates the contents of the display within the Image adjustment setting area 1310. After the updating of the page unit setting screen 1300 is completed, the processing returns to step S1601 and preparations are made for the next user's input.

The above is the contents of the page unit setting processing.

[Toner Adjustment Processing]

Figure 17:
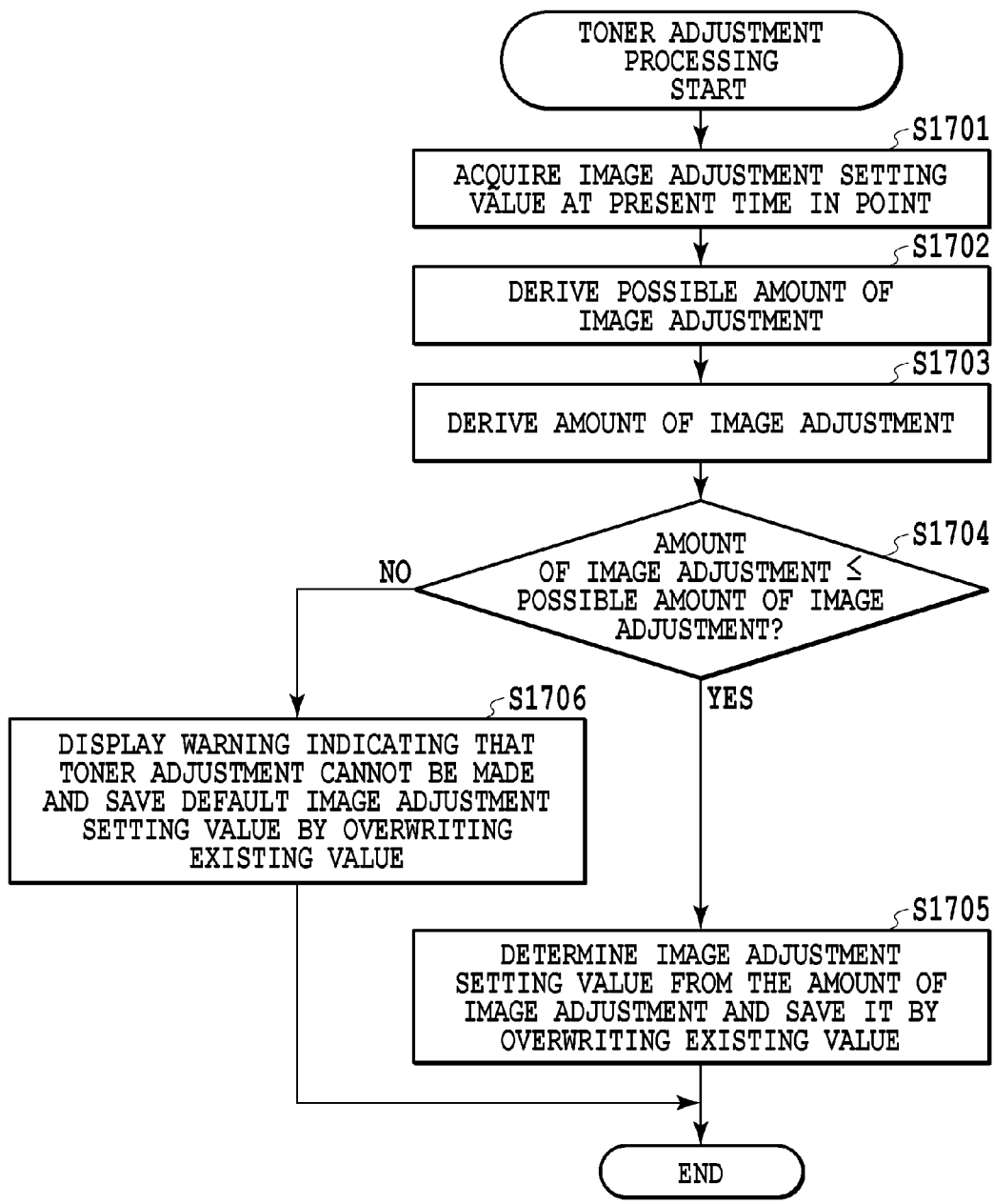
FIG. 17 is a flowchart showing a flow of toner adjustment processing.

Subsequently, the toner adjustment processing that is performed at steps S1006, S1503, S1611, etc., described previously is explained. FIG. 17 is a flowchart showing a flow of the toner adjustment processing in the page unit setting, i.e., the toner adjustment processing that is performed at step S1611. As an example of the toner adjustment processing that is performed in the page unit setting, there exists processing to reduce the toner consumption amount to an amount equal to or less the maximum toner consumption amount by changing the various kinds of image adjustment setting values in the case where the toner consumption amount that is expected at the present point in time exceeds the maximum toner consumption amount corresponding to the charging level that is set. In the following, the case where the toner consumption amount is reduced to or less than the maximum toner consumption amount corresponding to the charging level that is set by adjusting the density is explained.

At step S1701, the toner consumption amount adjustment unit 302 acquires the image adjustment setting values of the processing-target page at the present point in time. Here, as the image adjustment setting value, the toner consumption amount adjustment unit 302 acquires the density adjustment setting value that is applied to the CMYK bitmap image data of the processing-target page from the first memory 3040. In the present embodiment, it is assumed that the density adjustment setting value has levels from −6 to +6 (see the Density adjustment slide bar 1311 on the page unit setting screen 1300 shown in FIG. 13A or FIG. 13B described previously). In this case, it is possible to reduce the toner consumption amount by reducing the density adjustment setting value to decrease the density. In the present embodiment, it is assumed that the density is decreased by 5% each time the density adjustment setting value is reduced by one level and the density is decreased by 30% in the case where the density adjustment setting value is reduced by six levels.

At step S1702, the toner consumption amount adjustment unit 302 checks the remaining number of levels by which the image adjustment setting value can be reduced, and thereby, finds the possible amount of image adjustment. Here, the number of levels corresponding to a difference between the acquired density adjustment setting value and the minimum value of the density adjustment setting value that can be set is found by calculation or the like and the number of levels is temporarily saved in the RAM or the like, not shown, within the toner consumption amount adjustment unit 302. This difference, i.e., the number of levels that can be adjusted is the possible amount of image adjustment.

At step S1703, the toner consumption amount adjustment unit 302 finds the toner adjustment amount by which the toner consumption amount that is expected at the present point in time is reduced to or less than the maximum toner consumption amount corresponding to the charging level that is set by calculation or the like. Then, the toner consumption amount adjustment unit 302 derives the image adjustment amount corresponding to the toner adjustment amount by which the toner corresponding to the toner adjustment amount that is found is reduced. The procedure to derive the image adjustment amount is as follow.

1) First, the toner consumption amount that is expected at the present point in time and the range of the permitted toner consumption amount corresponding to the charging level that is set are acquired from the storage unit 304.

2) Next, the toner adjustment amount is found by subtracting a predetermined value within the range of the permitted toner consumption amount corresponding to the charging level that is set from the toner consumption amount that is expected at the present point in time. Here, the predetermined value may be an arbitrary value that is included in the range corresponding to the charging level that is set, such as the maximum toner consumption amount within the range corresponding to the charging level that is set, and a toner consumption amount whose magnitude is approximately intermediate.

3) Then, from a ratio between the toner consumption amount that is found and the toner consumption amount that is expected at the present point in time, the necessary percentage by which the density needs to be decreased is found and the image adjustment amount in accordance with the percentage is determined. For example, in the case where the density needs to be decreased by 3%, the image adjustment amount is set to one level, in the case where the density needs to be reduced by 10%, the image adjustment amount is set to two levels, and so on. However, in the present embodiment, in the case where it is desired to decrease the density by 30% or more, it is not possible to implement the decrease in density only by adjusting the level of the density adjustment setting value. The image adjustment amount thus derived is temporarily stored in the RAM or the like, not shown, within the toner consumption amount adjustment unit 302.

At step S1704, the toner consumption amount adjustment unit 302 reads the possible amount of image adjustment that is derived at step S1702 and the image adjustment amount that is derived at step S1703 from the RAM or the like and determines which is larger. In the case where the results of the determination indicate that the image adjustment amount is equal to or less than the possible amount of image adjustment, the processing proceeds to step S1705 and in the case where the image adjustment amount is larger than the possible amount of image adjustment, the processing proceeds to step S1706.

At step S1705, the toner consumption amount adjustment unit 302 determines the image adjustment setting value in the case where the toner consumption amount is adjusted so as to be equal to or less than the maximum toner consumption amount corresponding to the charging level that is set based on the image adjustment setting value at the present point in time that is acquired at step 1701 and the image adjustment amount that is derived at step S1703. Specifically, in the case where the image adjustment setting value at the present point in time that is acquired at step S1701 is taken to be level N and the image adjustment amount that is derived at step S1703 is taken to be level M, then, the image adjustment setting value is determined to be level N-M at step S1705. The determined image adjustment setting value is saved in the first memory 3040 by overwriting the existing value.

Figure 14B:
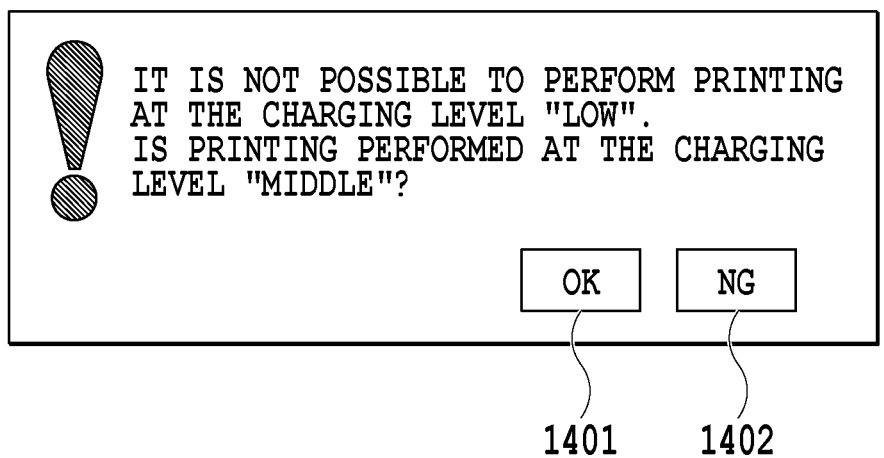

At step S1706, the toner consumption amount adjustment unit 302 notifies a user of the fact that toner adjustment cannot be made by, for example, displaying a warning screen on the display unit, not shown (see the warning screen in FIG. 14A described previously). After issuing such a warning, the toner consumption amount adjustment unit 302 saves the image adjustment setting value at the present point in time in the first memory 3040 by overwriting the existing value. At this time, the image adjustment setting value that is saved in the first memory 3040 is the same before and after the saving by overwriting. Alternatively, it may also be possible to display the warning screen as illustrated in FIG. 14B in place of the warning screen in FIG. 14A in the case where a user has changed the charging level from "High" to "Low" and on a condition that the image adjustment setting value that satisfies the charging level "Low" does not exist. At this time, in the case where an OK button 1401 is pressed down, the image adjustment setting value that satisfies the charging level "Middle" is saved in the first memory 3040 by overwriting the existing value. On the other hand, in the case where an NG button 1402 is pressed down, the image adjustment setting value at the present point in time is saved in the first memory 3040 by overwriting the existing value.

Here, the method for making toner adjustment by using the density adjustment setting value that is included in the image adjustment setting values is explained, but the image adjustment setting value for making toner adjustment is not limited to the density adjustment. Any adjustment may be accepted as long as the adjustment can change toner consumption amount.

In the explanation described above, the toner adjustment processing that is performed in order to reduce the toner consumption amount in the page unit setting is explained. The toner adjustment processing in the job unit setting is also the same. In other words, it is required only to read the explanation by changing the "charging level that is set" in the above-described explanation of the toner adjustment processing into the "upper limit of the charging level that is set".

The above is the contents of the toner adjustment processing.

Second Embodiment

Here, points different from those of the first embodiment are explained mainly.

In the first embodiment, explanation is given by taking the stepwise charging, which is an example of the charging system, as an example. However, as the charging system, an aspect in which a different fixed amount is charged depending on whether printing is color printing or monochrome printing, or a system, such as a volume-based charging system, in which the charging amount varies non-stepwise in accordance with the toner consumption amount, exists in addition to the stepwise charging.

Consequently, in the case where a printer adopts such a charging system, it is necessary for the control unit 300 to acquire printer information in accordance with the above-described various charging systems and to display a screen on the display unit, not shown, on which the displays in the Charging system display area 1101 and in the charging level display 1102 area are switched in accordance with the model type information and the setting information along the charging system, which are included in the acquired printer information.

For example, in the case where the charging system that a printer adopts is the stepwise charging in three steps of charging level as shown in the first embodiment, the control unit 300 displays a stepwise graph in the Charging system display area 1101 and displays the charging levels, such as "High", "Middle", and "Low", in the charging level display area 1102 (see FIG. 11). On the other hand, in the case where the charging system that a printer adopts is the volume-based charging, the control unit 300 displays a straight line or a curve that increases in the rightward direction, showing the way the charging amount increases in accordance with the toner consumption amount in the Charging system display area 1101 and displays the charging amount itself, or a numerical value indicating a rough charging level that is determined in advance in the charging level display area 1102. As to the Charging level upper limit setting area 1201 in FIG. 12A and the Charging level setting area 1304 in FIG. 13A also, it is necessary to produce a display in accordance with the charging system that a printer adopts and the display or the like of the button is changed accordingly.

As above, by switching the display formats of charging information in accordance with the charging system that a printer adopts, it is made possible to display charging information in accordance with a larger number of printer model types.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to appropriately control the display relating to charging accompanying printing processing in accordance with the situation on the side of a printing apparatus in an information processing apparatus that is connected to the printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-010315, filed Jan. 22, 2015, which is hereby incorporated by reference wherein in its entirety.

What is claimed is:

1. An information processing apparatus comprising:
a processor; and
a memory storing a program that, when executed by the processor, causes the information processing apparatus to execute:
acquiring information on a printing apparatus that is specified as an output destination by a user; and
determining whether or not to present charging information relating to printing based on the acquired information on the printing apparatus
wherein the information on the printing apparatus includes model type information indicating whether or not the printing apparatus is a model type compatible with stepwise charging, setting information indicating whether or not the printing apparatus makes use of a stepwise charging function, and setting information indicating whether or not to permit presentation of information relating to stepwise charging to the user to permit a change in information relating to stepwise charging from the user.

2. The information processing apparatus according to claim 1, further comprising a display unit configured to display a user interface screen in which the user gives instructions relating to printing in the printing apparatus, wherein the display unit displays an input item, which the user is caused to fill in to specify whether or not charging information relating to printing is presented on the user interface screen, in a case where the acquired information on the printing apparatus indicates that the printing apparatus specified as the output destination by the user is a type having a charging function.

3. The information processing apparatus according to claim 2, wherein the display unit is further configured to display a charging information screen in a case where an input by the user is received on the user interface screen.

4. The information processing apparatus according to claim 3, wherein:
the charging information screen includes an area where a charging system that the printing apparatus adopts is displayed and an output button, and
in a case where the output button is pressed down, image data on which image processing relating to charging has been performed is transmitted to the printing apparatus.

5. The information processing apparatus according to claim 4, wherein the image processing relating to charging includes processing to adjust a toner consumption amount in accordance with a charging level of stepwise charging.

6. The information processing apparatus according to claim 2, wherein:
the input item is a checkbox,
the user interface screen further comprises an OK button that fixes a setting being displayed and advances the operation,
in a case where the OK button is pressed down in a state where the checkbox is checked, a charging information screen is displayed, and
in a case where the OK button is pressed down in a state where the checkbox is not checked, printing processing is started without displaying a charging information screen.

7. The information processing apparatus according to claim 1, further comprising a display unit configured to display a user interface screen capable of receiving a user input to give instructions to present charging information relating to printing in a case where the acquired information on the printing apparatus indicates that the printing apparatus specified as the output destination by the user is a type having a charging function.

8. The information processing apparatus according to claim 1, wherein, in a case where the acquired information on the printing apparatus indicates that the printing apparatus is a model type compatible with stepwise charging, that the printing apparatus makes use of a stepwise charging function, and that presentation of charging information to the user and a change in information relating to stepwise charging from the user are permitted, reception of an input by the user is made possible.

9. The information processing apparatus according to claim 1, further comprising a display unit configured to display a charging information screen in accordance with a charging system that the printing apparatus adopts.

10. The information processing apparatus according to claim 9, wherein the charging system is one of:
a system of stepwise charging in which a charging amount increases stepwise as a toner consumption amount increases;
a system in which a different fixed amount is charged depending on whether printing is color printing or monochrome printing; and
a system of volume-based charging in which a charging amount varies non-stepwise in accordance with a toner consumption amount.

11. The information processing apparatus according to claim 1, wherein the processor further executes an image adjustment processing step of performing image processing including density adjustment processing, sharpness processing, and toner reduction processing.

12. The information processing apparatus according to claim 11, wherein image data before image processing by the image adjustment processing step is performed is saved separately from image data after image processing by the image adjustment processing step is performed.

13. An information processing method-executed by a processor of an information processing apparatus, comprising:
an acquisition step of acquiring information on a printing apparatus that is specified as an output destination by a user; and
a determination step of determining whether or not to present charging information relating to printing based the acquired information on the printing apparatus
wherein the information on the printing apparatus includes model type information indicating whether or not the printing apparatus is a model type compatible with stepwise charging, setting information indicating whether or not the printing apparatus makes use of a stepwise charging function, and setting information indicating whether or not to permit presentation of information relating to stepwise charging to the user to permit a change in information relating to stepwise charging from the user.

14. A non-transitory computer readable storage medium storing a program causing a computer to function as an information processing apparatus, the program comprising:
code for an acquisition step of acquiring information on a printing apparatus that is specified as an output destination by a user; and
code for a determination step of determining whether or not to present charging information relating to printing based the acquired information on the printing apparatus
wherein the information on the printing apparatus includes model type information indicating whether or not the printing apparatus is a model type compatible with stepwise charging, setting information indicating whether or not the printing apparatus makes use of a stepwise charging function, and setting information indicating whether or not to permit presentation of information relating to stepwise charging to the user to permit a change in information relating to stepwise charging from the user.

15. An information processing apparatus comprising:
a processor; and
a memory storing a program that, when executed by the processor, causes the information processing apparatus to execute:
an acquisition step of acquiring information on a printing apparatus that is specified as an output destination by a user; and
a display control step of controlling whether or not to display an input item that a user is caused to fill in to specify whether or not charging information relating to printing is presented based on the acquired information on the printing apparatus
wherein the information on the printing apparatus includes model type information indicating whether or not the printing apparatus is a model type compatible with stepwise charging, setting information indicating whether or not the printing apparatus makes use of a stepwise charging function, and setting information indicating whether or not to permit presentation of information relating to stepwise charging to the user to permit a change in information relating to stepwise charging from the user.

16. An information processing apparatus comprising:
a processor; and a memory storing a program that, when executed by the processor, causes the information processing apparatus to execute:

an acquisition step of acquiring information on a printing apparatus that is specified as an output destination by a user; and a display control step of controlling whether or not to display charging information relating to printing based the acquired information on the printing apparatus wherein the information on the printing apparatus includes model type information indicating whether or not the printing apparatus is a model type compatible with stepwise charging, setting information indicating whether or not the printing apparatus makes use of a stepwise charging function, and setting information indicating whether or not to permit presentation of information relating to stepwise charging to the user to permit a change in information relating to stepwise charging from the user.

\* \* \* \* \*